(12) United States Patent
Tang et al.

(10) Patent No.: US 12,033,307 B2
(45) Date of Patent: Jul. 9, 2024

(54) SYSTEM AND METHODS FOR MULTIPLE INSTANCE SEGMENTATION AND TRACKING

(71) Applicant: HUAWEI TECHNOLOGIES CO., LTD., Shenzhen (CN)

(72) Inventors: Qiang Tang, Burnaby (CA); Vishnu Sanjay Ramiya Srinivasan, Scarborough (CA); Shao Hua Chen, Surrey (CA); Zhan Xu, Richmond (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 342 days.

(21) Appl. No.: 17/525,250

(22) Filed: Nov. 12, 2021

(65) Prior Publication Data

US 2023/0153962 A1 May 18, 2023

(51) Int. Cl.
*G06T 5/00* (2024.01)
*G06K 9/62* (2022.01)
(Continued)

(52) U.S. Cl.
CPC ............. *G06T 5/77* (2024.01); *G06N 3/04* (2013.01); *G06T 7/136* (2017.01); *G06V 10/757* (2022.01)

(58) Field of Classification Search
CPC ....... G06T 5/005; G06T 7/136; G06V 10/757; G06N 3/04
See application file for complete search history.

(56) References Cited

U.S. PATENT DOCUMENTS

2021/0326638 A1 10/2021 Lee et al.
2023/0153962 A1* 5/2023 Tang ............... G06V 10/82
382/103

FOREIGN PATENT DOCUMENTS

CN 106780536 A 5/2017
CN 110188705 A 8/2019
(Continued)

OTHER PUBLICATIONS

Zhang, L., Lin, Z., Zhang, J., Lu, H., & He, Y. (2019). Fast video object segmentation via dynamic targeting network. In Proceedings of the IEEE/CVF International Conference on Computer Vision, pp. 5582-5591 (10 Pages) (Year: 2019).*

(Continued)

*Primary Examiner* — David F Dunphy

(57) ABSTRACT

This disclosure provides for methods and a system for multiple instance segmentation and tracking. According to an aspect a method is provided. The method includes sending an image to a backbone network and generating image feature outputs. The method further includes sending the image feature outputs to a spatial attention module for generating a feature map associated with objects in the image. The method further includes sending the feature map to a category feature module for generating an instance category output indicating the objects. The method further includes sending the image feature outputs to a mask generating module for generating masks. The method further includes generating: the instance category output via the category feature module, and the masks via the mask generating module. In some embodiments, the method further includes generating re-identification embedding information associated with the objects based on image feature outputs.

20 Claims, 17 Drawing Sheets

(51) Int. Cl.
*G06N 3/04* (2023.01)
*G06T 5/77* (2024.01)
*G06T 7/136* (2017.01)
*G06V 10/75* (2022.01)

(56) References Cited

FOREIGN PATENT DOCUMENTS

| | | |
|---|---|---|
| CN | 111950362 A | 11/2020 |
| CN | 113096140 A | 7/2021 |
| CN | 113379795 A | 9/2021 |
| CN | 113469287 A | 10/2021 |
| CN | 113506317 A | 10/2021 |

OTHER PUBLICATIONS

He, K., Gkioxari, G., Dollar, P., & Girshick, R. (2017). Mask r-cnn. In Proceedings of the IEEE international conference on computer vision, pp. 2961-2969 (9 Pages) (Year: 2017).*

Voigtlaender, P., Krause, M., Osep, A., Luiten, J., Sekar, B. B. G., Geiger, A., & Leibe, B. (2019). Mots: Multi-object tracking and segmentation. In Proceedings of the ieee/cvf conference on computer vision and pattern recognition, pp. 7942-7951 (10 Pages) (Year: 2019).*

K. He et al. "Mask R-CNN." In International Conference on Computer Vision (ICCV), 2017.

Xinlong Wang et al. "SOLO: Segmenting Objects by Locations," In: Proc. European Conference on Computer Vision (ECCV), 2020.

Daniel Bolya et al. "YOLACT: Real-time Instance Segmentation". Proc. IEEE International Conference on Computer Vision (ICCV), 2019.

Paul Voigtlaender et al. "MOTS: Multi-Object Tracking and Segmentation", Proc. IEEE Conference on Computer Vision and Pattern Recognition (CVPR) 2019.

Zhenbo Xu et al. "Segment as points for efficient online multi-object tracking and segmentation", In Proceedings of the European Conference on Computer Vision (ECCV), 2020.

Yifu Zhang et al. "FairMOT: On the Fairness of Detection and Re-Identification in Multiple Object Tracking", arXiv technical report (arXiv 2004.01888), 2021.

Fisher Yu et al. "Deep Layer Aggregation", Proc. IEEE Conference on Computer Vision and Pattern Recognition (CVPR) 2018.

Sanghyun Woo et al. "CBAM: Convolutional Block Attention Module", In: Proc. European Conference on Computer Vision (ECCV), 2018.

Seyed Sadegh Mohseni Salehi et al. "Tversky loss function for image segmentation using 3D fully convolutional deep networks", In: Proc. International Workshop on Machine Learning in Medical Imaging, 2017.

Nicolai Wojke et al. "Simple Online and Realtime Tracking with a Deep Association Metric", In: Proc. IEEE International Conference on Image Processing (ICIP), 2017.

Roland S. Zimmermann et al. "Faster Training of Mask {R-CNN} by Focusing on Instance Boundaries", Computer Vision and Image Understanding, vol. 188, 2019.

* cited by examiner

SYSTEM AND METHODS FOR MULTIPLE INSTANCE SEGMENTATION AND TRACKING

CROSS-REFERENCE TO RELATED APPLICATIONS

This is the first application filed for the present invention.

FIELD OF THE INVENTION

The present invention pertains to the field of computer vision field, and in particular to methods and systems for multiple instance segmentation and tracking.

BACKGROUND

Existing segmentation and tracking techniques suffer from a number of limitations. For example, obtaining high quality masks including accurate mask boundaries continue to be an ongoing challenge for such techniques. Avoiding under-segmentation masks is another ongoing challenge with existing techniques. Some high-level vision tasks are more sensitive to under-segmentation errors than others. For instance, in image or video inpainting applications, the left-over masks (e.g., finger tips or shoe toes etc.) may generate annoying artifacts. Efficiently tracking instance masks in a video sequence is yet another challenge for existing techniques that may benefit from further improvement.

Therefore, there is a need for methods and system for multiple instance segmentation and tracking that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

This present disclosure provides methods and system for multiple instance segmentation and tracking. According to a first aspect, a method is provided. The method includes sending an input image to a backbone network. The method further includes generating, via the backbone network, one or more image feature outputs. The method further includes sending the one or more image feature outputs to a spatial attention module for generating a feature map associated with one or more objects in the input image. The method further includes sending the feature map to a category feature module for generating an instance category output indicating with the one or more objects. The method further includes sending the one or more image feature outputs to a mask generating module for generating one or more masks, each associated with an object in the input image. The method further includes generating: the instance category output via the category feature module, and the one or more masks via the mask generating module. The method may provide for a one-stage segmentation and tracking system that may avoid under-segmentation artifacts in the generated masks.

In some embodiments of the first aspect, the generating the one or more masks via the mask generating module includes sending the one or more image feature outputs to an instance mask feature module for generating a second set of one or more masks, each associated with an object in the input image. In some embodiments, the generating the one or more masks via the mask generating module further includes sending the second set of one or more masks to a mask refinement module for generating the one or more masks. In some embodiments, the generating the one or more masks via the mask generating module further includes generating the one or more masks via the mask refinement module. The method may provide for instance masks with enhanced dilation, which may avoid over-dilations.

In some embodiments of the first aspect, the one or more masks is generated based on one or more low-level image features included in the one or more image feature outputs. In some embodiments, the generating the one or more masks via the mask refinement module includes sending the one or more low-level features to the mask refinement module. In some embodiments, the generating the one or more masks via the mask refinement module further includes concatenating the second set of one or more masks with the one or more low-level features. The method may provide for improved mask boundaries.

In some embodiments of the first aspect, the method further includes sending the one or more image feature outputs to a re-identification (Re-ID) feature module for generating Re-ID embedding information associated with the one or more objects in the input image. In some embodiments, the method further includes generating the Re-ID embedding information via the Re-ID feature module. The method may provide for improved tracking operation based on the Re-ID embedding information.

In some embodiments of the first aspect, the method further includes sending, to a tracking and matching module, tracking information comprising one or more of: the Re-ID embedding information, the instance category output, and the one or more masks. In some embodiments, the method further includes tracking, by the tracking and matching module, the one or more objects based the tracking information. The method may provide for improved tracking and matching operations.

According to a second aspect, another method is provided. The method includes sending an input image to a backbone network. The method further includes generating, via the backbone network, one or more image feature outputs. The method further includes sending the one or more image feature outputs to a category indicating module for generating an instance category output indicating one or more objects in the input image. The method further includes sending the one or more image feature outputs to an instance mask feature module for generating a first set of one or more masks, each associated with an object in the input image. The method further includes sending the first set of one or more masks to a mask refinement module for generating a second set of one or more masks. The method further includes generating: the instance category output via the category indicating module, and the second set of one or more masks via the mask refinement module. The method may provide for a one-stage segmentation and tracking system that may avoid under-segmentation artifacts in the generated masks.

In some embodiments of the second aspect, the generating the instance category output via the category indicating module includes sending the one or more image feature outputs to a spatial attention module for generating a feature map indicating the one or more objects in the input image. In some embodiments, the generating the instance category output via the category indicating module further includes sending the feature map to a category feature module for generating the instance category output. In some embodiments, the generating the instance category output via the category indicating module further includes generating the instance category output via the category feature module. The method may provide for an enhanced object detection operation.

In some embodiments of the second aspect, the second set of one or more masks is generated based on one or more low-level image feature included in the one or more image feature outputs. In some embodiments, the generating the second set of one or more masks via the mask refinement module includes sending the one or more low-level features to the mask refinement module. In some embodiments, the generating the second set of one or more masks via the mask refinement module further includes concatenating the first set of one or more masks with the one or more low-level features. The method may provide for instance masks with enhanced dilation, which may avoid over-dilations.

In some embodiments of the second aspect, the method further includes sending the one or more image feature outputs to a re-identification (Re-ID) feature module for generating Re-ID embedding information associated with the one or more objects in the input image. In some embodiments, the method further includes generating the Re-ID embedding information via the Re-ID feature module. The method may provide for improved tracking operation based on the Re-ID embedding information.

In some embodiments of the second aspect, the method further includes sending, to a tracking and matching module, tracking information including one or more of: the Re-ID embedding information, the instance category output, and the second set of one or more masks. In some embodiments, the method further includes tracking, by the tracking and matching module, the one or more objects based the tracking information. The method may provide for improved tracking and matching operations.

According to a third aspect, another method is provided. The method includes sending an input image to a backbone network. The method further includes generating, via the backbone network, one or more image feature outputs. The method further includes sending the one or more image feature outputs to a category indicating module for generating an instance category output indicating one or more objects in the input image. The method further includes sending the one or more image feature outputs to a mask generating module for generating one or more masks, each associated with an object in the input image. The method further includes sending the one or more image feature outputs to a re-identification (Re-ID) feature module for generating Re-ID embedding information associated with the one or more objects in the input image. The method further includes generating: the instance category output via the category indicating module, the one or more masks via the mask generating module, and the Re-ID embedding information via the Re-ID feature module. The method may provide for a one-stage segmentation and tracking system that may generate category output, mask outputs and Re-ID embedding information. In some embodiments the method may provide for generating the category output, mask outputs and Re-ID embedding information at the same time.

In some embodiments of the third aspect, the generating the instance category output via the category indicating module includes sending the one or more image feature outputs to a spatial attention module for generating a feature map indicating the one or more objects in the input image. In some embodiments, the generating the instance category output via the category indicating module further includes sending the feature map to a category feature module for generating the instance category output. In some embodiments, the generating the instance category output via the category indicating module further includes generating the instance category output via the category feature module. The method may provide for an enhanced object detection operation.

In some embodiments of the third aspect, the generating the one or more masks via the mask generating module includes sending the one or more image feature outputs to an instance mask feature module for generating a second set of one or more masks, each associated with an object in the input image. In some embodiments, the generating the one or more masks via the mask generating module further includes sending the second set of one or more masks to a mask refinement module for generating the one or more masks. In some embodiments, the generating the one or more masks via the mask generating module further includes generating the one or more masks via the mask refinement module. The method may provide for instance masks with enhanced dilation, which may avoid over-dilations.

In some embodiments of the third aspect, the one or more masks is generated based on one or more low-level image features included in the one or more image feature outputs. In some embodiments, the generating the one or more masks via the mask refinement module includes sending the one or more low-level image features to the mask refinement module. In some embodiments, the generating the one or more masks via the mask refinement module further includes concatenating the second set of one or more masks with the one or more low-level features. The method may provide for improved mask boundaries.

In some embodiments of the third aspect, the method further includes sending, to a tracking and matching module, tracking information including one or more of: the Re-ID embedding information, the instance category output, and the one or more masks. In some embodiments, the method further includes tracking, by the tracking and matching module, the one or more objects based the tracking information. The method may provide for improved tracking and matching operations.

In some embodiments of the one or more foregoing aspects, the second set of one or more masks are trained based on Tversky loss to generate dilated masks. The method may provide for improved dilated masks.

In some embodiments of the one or more foregoing aspect, the one or more masks are trained based on one or more edge loss and dice loss. The method may provide for improved mask boundaries.

In some embodiments of the one or more foregoing aspect, the instance category output indicates the one or more object via assigning a higher score to portions of the input image including the one or more object than non-object portions. The method may provide for improved detection operations.

In some embodiments of the one or more foregoing aspects, each of the one or more mask is an instance mask. In some embodiments, each of the one or more mask corresponds to an object in the input image. each of the one or more mask includes a plurality of pixels, each indicating a probability of belonging to the object in the input image.

In some embodiments of the one or more foregoing aspects, the backbone network is a deep layer aggregation network.

According to a fourth aspect, an apparatus is provided, where the apparatus includes modules configured to perform the methods in the one or more foregoing aspects.

According to a fifth aspect, an apparatus is provided, where the apparatus includes: a memory, configured to store a program; a processor, configured to execute the program stored in the memory, and when the program stored in the memory is executed, the processor is configured to perform the methods in the one or more foregoing aspects.

According to a sixth aspect, a computer readable medium is provided, where the computer readable medium stores program code executed by a device, and the program code is used to perform the method in the one or more foregoing aspects.

According to a seventh aspect, a computer program product including an instruction is provided. When the computer program product is run on a computer, the computer performs the method in the one or more foregoing aspects.

According to a eighth aspect, a chip is provided, where the chip includes a processor and a data interface, and the processor reads, by using the data interface, an instruction stored in a memory, to perform the methods in the one or more foregoing aspects.

Optionally, in an implementation, the chip may further include the memory. The memory stores the instruction, and the processor is configured to execute the instruction stored in the memory. When the instruction is executed, the processor is configured to perform the method in the first aspect.

According to a ninth aspect, an electronic device is provided. The electronic device includes an action recognition apparatus in any one or more foregoing aspects.

Other aspects of the disclosure provide for apparatus, and systems configured to implement the methods disclosed herein. For example, wireless stations and access points can be configured with machine readable memory containing instructions, which when executed by the processors of these devices, configures the device to perform the methods disclosed herein.

Embodiments have been described above in conjunction with aspects of the present invention upon which they can be implemented. Those skilled in the art will appreciate that embodiments may be implemented in conjunction with the aspect with which they are described but may also be implemented with other embodiments of that aspect. When embodiments are mutually exclusive, or are incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
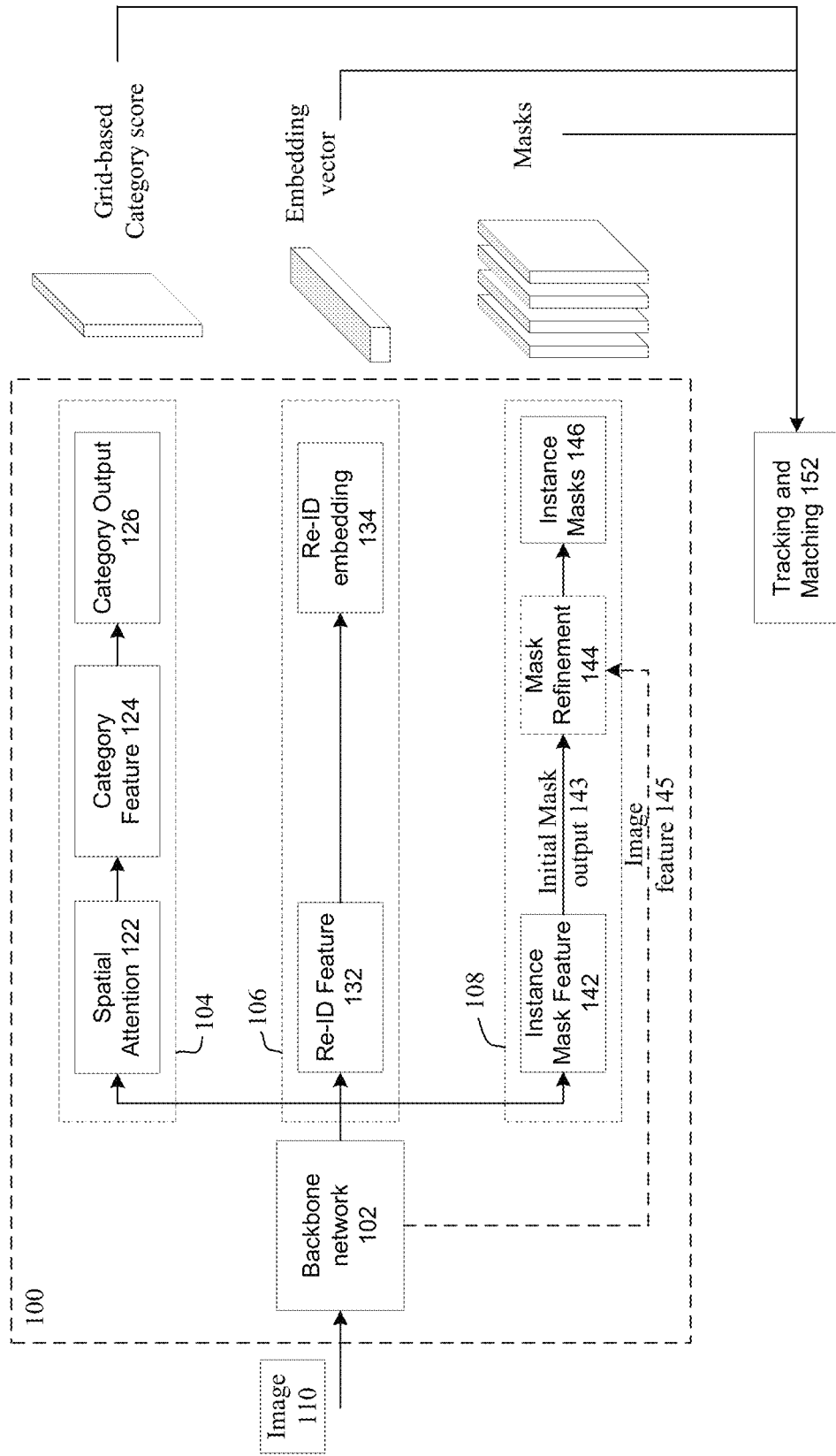
FIG. 1 illustrates a system pipeline, according to an embodiment of the present disclosure.

Instance segmentation is a fundamental vision task that serves many high level vision tasks, such as image editing, scene understanding, etc. However, obtaining high quality masks using existing algorithms is challenging. Some high-level vision tasks are more sensitive to under-segmentation errors than others. For instance, in image or video inpainting applications, the left-over masks (e.g., finger tips or shoe toes etc.) may generate annoying artifacts. Furthermore, multiple instance segmentation and tracking is a natural extension of instance segmentation which has broad applications such as autonomous driving or video inpainting.

Embodiments described herein may provide for high quality masks. While embodiments are described in reference to video inpainting applications, a person skilled in the art may appreciate that embodiments described herein (e.g., segmentation techniques) are not limited to video inpainting applications and may apply to various use case applications.

Use of smart devices has led to continuously increasing amount of video contents. At present, smartphones and other cameras capture all objects that are within the camera view angle in a scene. However, a user may want to remove some unwanted objects in a video. Existing video inpainting techniques typically require inpainting masks as input indicating the region for removal in each frame.

To generate the inpainting masks for all frames of a video, embodiments described herein may provide segmentation and tracking techniques for generating masks for each object. Embodiments described herein may further provide for tracking the generated mask for each object across the one or more frames of a video. Accordingly, in some embodiments, one or more objects may be selected manually or automatically via an algorithm for removal from one or more frames of a video.

Traditionally, instance segmentation techniques can be categorized into top-down and bottom-up approaches. Top-down approaches are multi-stage segmentation techniques: they first generate anchors (also known as object region proposals) which are simply bounding boxes, and then, perform segmentation within each proposed bounding box. Accordingly, top-down approaches follow a detect-then-segment scheme. Top-down approaches have limitations due to their inference speed. The bottom-up approaches are less popular than top-down approaches since bottom-up approaches normally have lower segmentation quality although at a faster speed.

Recently, one-stage segmentation has shown progress (e.g., segmenting objects by locations (SOLO), and YOLACT). SOLO is described in Wang, et al., "SOLO: Segmenting Objects by Locations," In: Proc. European Conference on Computer Vision (ECCV), 2020. YOLACT is described in Bolya, et al., "YOLACT: Real-time Instance Segmentation". Proc. IEEE International Conference on Computer Vision (ICCV), 2019. These one-stage segmentation algorithms may achieve better mask quality in a shorter time than multi-stage segmentation algorithms.

However, application of both segmentation and tracking based on one-stage image segmentation framework is only briefly discussed in literature. A two-stage segmentation network has been used to obtain multiple object segmentation and tracking (i.e., TrackRCNN), however, with very slow inference speed (3 frames per second (fps)). Track-RCNN is described in Voigtlaender, et al., Track R-CNN. In Conference on Computer Vision and Pattern Recognition (CVPR), 2019.

While one-stage segmentation and tracking has been proposed in literature, i.e., Zhenbo Xu, et al., PointTrack in European Conference on Computer Vision (ECCV), 2020, the instance embedding information is designed in a complicated manner. For example, such one-stage techniques require segmentation output to be obtained first, then they treat pixels inside the segmentation as point cloud data, and, thereafter, infer the resulting embedding information. Therefore, existing "one-stage" techniques may not viewed as a one-stage segmentation and tracking system since the instance embedding information is calculated after the segmentation. Further, the mask quality in such existing techniques may be inadequate for applications (e.g., image or video inpainting) that are more sensitive to under-segmentation errors.

Embodiments described herein may provide an enhanced one-stage segmentation and tracking framework. Embodiments described herein may further provide for enhanced one-stage segmentation framework SOLO. Embodiments described herein may further provide for a spatial attention module that further improves detection accuracy. Embodiments described herein may further provide for a mask refinement module that further improves mask boundary accuracy. Embodiments described herein may further provide for a simple instance embedded information generation module that extends to instance segmentation task. As a result, embodiments described herein may provide for obtaining instance embedding information obtained in parallel with segmentation mask.

Embodiments may further provide for applying Tversky loss into normal images domain with three color channels RGB (i.e., red, green and blue), which may avoid under-segmentation masks. Avoiding under-segmentation masks may be useful for applications that are sensitive to under-segmentation application such as image or video inpainting. Tversky loss is described in Seyed Sadegh Mohseni Salehi, Deniz Erdogmus, and Ali Gholipour, "Tversky loss function for image segmentation using 3D fully convolutional deep networks", In: Proc. International Workshop on Machine Learning in Medical Imaging, 2017.

As described herein, embodiments may provide for: accurate mask boundaries, efficiently track instance masks in video sequence; and avoid under-segmentation masks.

Embodiments described herein may provide for an enhanced one-stage framework for instance segmentation and tracking. The enhanced one-stage framework may generate instance category, instance masks and instance embedding information in three parallel branches. In some embodiments the enhanced one-stage framework may generate the instance category, instance masks and instance embedding information at the same time or simultaneously.

FIG. 1 illustrates a system pipeline, according to an embodiment of the present disclosure. The system pipeline 100 may comprise a backbone network 102 and one or more branches 104, 106 and 108. The backbone network 102 is fed with an input image 110 for extracting image features including one or more of low-level and high-level features.

Branch 104 may be referred to as the category branch, branch 106 may be referred to as the Re-ID branch, and branch 108 may be referred to as the mask branch. In an embodiment, the input to the system pipeline 100 may be an image 110.

The category branch 104 may comprise one or more of: a spatial attention module 122, and a category feature module 124. A person skilled in the art may appreciate that the spatial attention module and the category feature module may be similar to existing modules that perform these functions. The spatial attention module 122 is further described herein. In an embodiment, the category feature module 124 may output a category output 126 which may comprise grid-based category score.

In an embodiment, the spatial attention module 122 is provided with image feature outputs from the backbone network 102 and generates feature map outputs that are modulated by weights calculated from spatial attention module. The feature map outputs are fed into the category feature module 124, which generates category feature output. The category feature output may comprise a grid-based category score output.

The Re-ID branch 106 may comprise an Re-ID feature module 132 which may generate Re-ID embedding outputs 134. A person skilled in the art may appreciate that the Re-ID feature module may be similar to existing modules that perform these functions. Example implementations of Re-ID feature module 132 are further described herein. the Re-ID embedding outputs 134 may comprise one or more embedding vectors.

In an embodiment, the Re-ID feature module 132 may be fed with image features output from the backbone network 102 and may generate grid-based Re-ID embedding outputs 134.

The mask branch 108 may comprise one or more of: instance mask feature module 142 and a mask refinement module 144. The instance mask feature module 142 and the masks refinement module 146 may be similar to existing modules that perform such functions, as may be appreciated by a person skilled in the art. In an embodiment, an output of the mask branch may be one or more instance masks 146.

In an embodiment, the instance mask feature module 142 may be fed with image feature outputs from the backbone network 102 and may generate one or more initial mask outputs 143. In some embodiments, the one or more initial mask outputs 143 and low-level image features outputs 145 (from the backbone network) may then be fed into the mask refinement module 144 to generate refined instance mask outputs 146.

Outputs including one or more of category outputs 126, Re-ID embedding outputs 134, instance masks 146 and initial mask outputs 143 may be used for tracking and matching module 152 as further described herein. The tracking and matching module 152 may further be used to track instance masks 146 or initial mask outputs 143. Each mask of the initial masks output and the instance masks 146 may be associated with an object in the input image. Accordingly, each tracked mask (the tracking performed via the tracking and matching module 152) may be associated with a tracked object.

In an embodiment, an object in a frame (e.g., an image 110) of a video may be tracked across frames of the video. For example, the object may be indicated via an instance (e.g., instance mask 146). The object may further be indicated via embedding information (e.g., Re-ID embedding output 134). Accordingly, the object, via its associated mask, may be tracked via its associated embedding information. In some embodiments, the category output 126 may further be used in combination with the embedding information 134 to track the object.

The system pipeline 100 may achieve one-stage segmentation, Re-ID and detection in three parallel branches 104, 106 and 108, i.e., the three branches share the same backbone network 102 and are independent from each other. In some embodiments, the Re-ID branch 106 may comprise two convolution layers as further described herein. In some embodiments, a post-processing step may be applied for matching the detection results with segmentation results. In some embodiments, the system pipeline 100 may provide for a tracking process that uses the output instance embedding information 134 for tracking operations.

In an embodiment, image 110 is fed into the system pipeline 100, which may be referred to as an inference pipeline. The input image 110 is first processed through the backbone 102 for extracting semantic image features. Then the extracted semantic image features are fed into three parallel branches 104, 106 and 108 as illustrated. In some embodiments, the category branch may predict an instance category label associated with the image. In some embodiments, the Re-ID branch may generate instance embedding information associated with the image. In some embodiments, the mask branch 108 may predict one or more instance masks.

As may be appreciated by a person skilled in the art, a network, such as the backbone network 102, may be trained via pair data, which includes an input and the expected output (ground truth). During the training, the input data may be fed to the network, and the network's output is compared with the expected output (ground truth). Based on the error between the network's output and the expected output, the network's weight may be updated. The network training may continue until the error is reduced.

Figure 2:
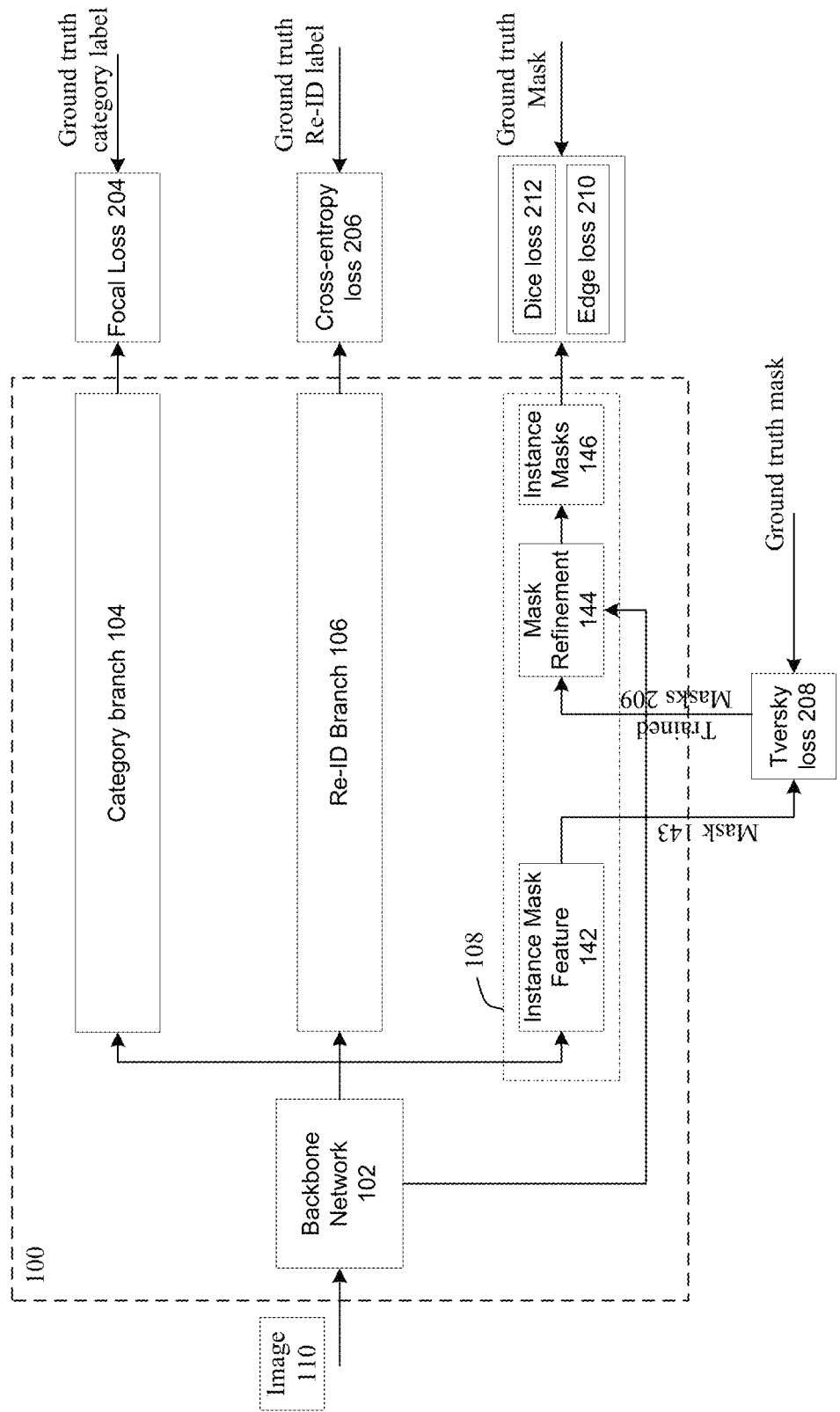
FIG. 2 illustrates training loss for the system pipeline of FIG. 1, according to an embodiment of the present disclosure.

FIG. 2 illustrates training loss for the system pipeline of FIG. 1, according to an embodiment of the present disclosure. FIG. 2 illustrates training loss for each branch of the system pipeline 100. In an embodiment, the training loss for the category branch 104 may be based on focal loss 204 and the ground truth category label. Focal loss is described in Lin et al., "Focal Loss for Dense Object Detection", arXiv technical report (arXiv 1708.02002). The focal loss may be used to train one or both of the backbone network 102 and the category branch 104.

In an embodiment, the training loss for the Re-ID branch 106 may be based on cross-entropy loss 206 and ground truth Re-ID label. As may be appreciated by a person skilled in the art, the cross-entropy loss may refer to any entropy loss implementation in any deep learning framework. The cross-entropy loss may also be known as logarithmic loss, log loss or logistic loss, which is widely used in image classification tasks. The cross-entropy loss may be used to train either Re-ID branch 106 alone, or together with the last several layers of the backbone network 102. In a preferred implementation, the cross-entropy loss may be used to train only the Re-ID branch 106.

In an embodiment, Tversky loss 208 is used to calculate the differences between masks before refinement and the ground truth masks. In some embodiments, the masks before refinement may yield semantic dilated masks. Tversky loss is described in Salehi et al., "Tversky loss function for image segmentation using 3D fully convolutional deep networks", In: Proc. International Workshop on Machine Learning in Medical Imaging, 2017. Accordingly, one or more initial mask outputs 143 may be trained based on Tversky loss 208 to generate trained masks 209 (semantic dilated masks). As may be appreciated by a person skilled in the art, the semantic dilated masks are more suitable for applications that are sensitive to under segmentation errors. In some embodiments, edge loss 210 may be used to calculate the difference between the masks after refinement and the group truth masks. In some embodiments, the masks after refinement may have improved mask boundaries (e.g., more tightly fit the object boundaries). As may be appreciated by a person skilled in the art, the refined mask with better boundary accuracy is more suitable for applications that are sensitive to over segmentation errors. In some embodiments Dice loss 212 is used together with edge loss to calculate the difference between the refined mask outputs and the ground truth masks. Dice loss is described in Sudre et al., "Generalised dice overlap as a deep learning loss function for highly unbalanced segmentations," arXiv:1707.03237. In some embodiments, one or more of the Tversky loss, Dice loss and edge loss may be used to train one or more of the Backbone Network 102, Instance Mask Feature 142, and Mask Refinement 144.

Figure 3:
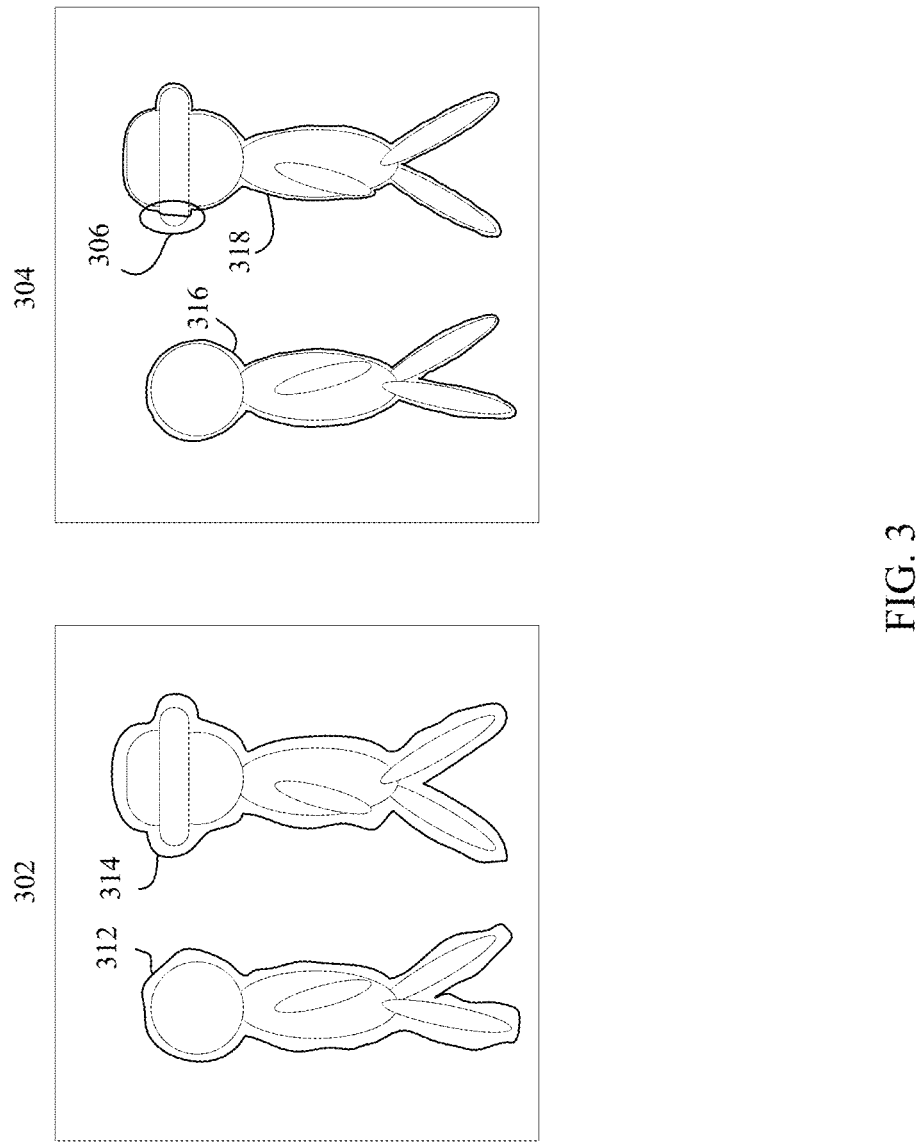
FIG. 3 illustrates an example of output masks before and after refinement, according to an embodiment of the present disclosure.

FIG. 3 illustrates an example of output masks before and after refinement, according to an embodiment of the present disclosure. Image 302 and 304 illustrate the mask improvement obtained via using edge loss 210 and dice loss 212. Image 302 illustrates semantic dilated masks 312 and 314 based on training with Tversky loss 208. Image 304 illustrates refined masks 316 and 318 based on training with edge loss 210 and dice loss 212. As illustrated, while the refined masks 316 and 318 in image 304 more tightly fit the human mask boundary in comparison to the masks 312 and 314, the refined masks 316 and 318 may introduce some minor under segmentation results, for example, portion 306 (portion of the hat is not covered by the mask 318). On the other hand, Image 302 illustrates semantic dilated masks, which avoids any under segmentation artifact.

As mentioned herein the category output branch 126 is a grid-based category score. In an embodiment, the grid-based category score may comprise the input image 110 split into M×N grids (for example, 40×40) forming a plurality of units (e.g., a rectangle with a fixed number of pixels).

The scoring mechanism for each formed unit of the grid may be based on the unit's relative distance to the center of the object of interest. For example, units closer to the center of the object of interest may be assigned a higher category score, and similarly units farther away from the center of the object of interest may be assigned a lower category score. Accordingly, in an embodiment, grid score outputs 126 are automatically calculated from category feature branch 124. The inputs to the category feature module 124 are feature maps and the outputs are grid scores 126. In some embodiments, the category feature branch 104 may comprise several layers of convolutional neural networks. In some embodiments, the layers of the convolutional neural networks associated with the category branch 104 may be similar to those of the SOLO. In some embodiments, the weights of these convolutional neural networks may be trained by using paired data, i.e., an image and the corresponding object center. During the training, each unit is assigned a category score based on its distance from the center of object of interest. Therefore, units at the center of object of interest may be assigned the highest category score. In some embodiments, the category branch 104 may be trained together with the backbone network 102.

Figure 5:
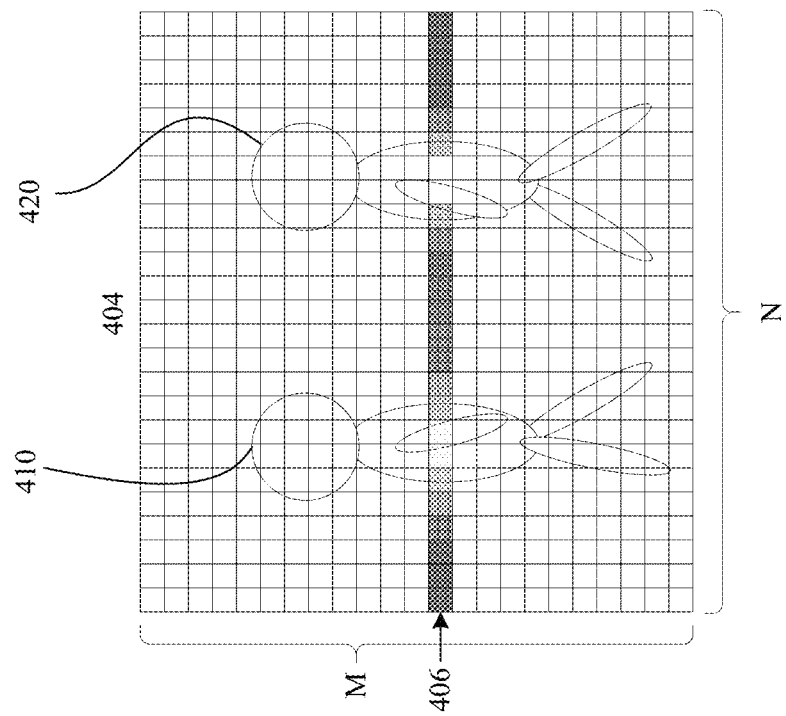
FIGS. 4 and 5 illustrate an input image and a corresponding category output, according to an embodiment of the present disclosure.
Figure 4:
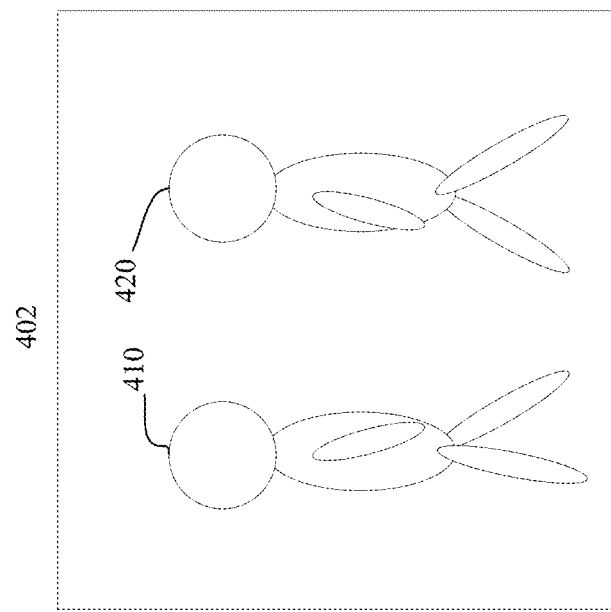

FIGS. 4 and 5 illustrate an input image and a corresponding category output, according to an embodiment of the present disclosure. Image 402 may be an input image to the system pipeline 100. In an embodiment, the category branch 104 may generate a grid-base category score output 404. As illustrated category, output 404 may comprise the image split into M×N grids forming a plurality of units. For illustrative purposes, only the scoring representation of row 406 is shown. As illustrated, units closer to the center of the objects of interest 410 and 420 are shown brighter (indicative of a higher category score) compared to units further from the center of the object 410 and 420, which are shown as darker (indicative of a lower category score).

The Re-ID embedding output 134 may comprise one or more of instance embedding outputs. An instance embedding output may indicate a per pixel vector. The instance embedding output may be used for instance association in tracking and matching module 152. For instance, the spatial resolution of the embedding output may be denoted as H×W, where H may represent the height and W may represent the width. For each point in the H×W, the corresponding embedding may contain N values as a vector. In a preferred implementation, N may be 128 by considering the balance between accuracy and complexity. This instance association process (of the tracking and matching module 152) may be referred to as Re-ID (Re-Identification). Similarly, instance embedding may be referred to as Re-Id embedding.

Figure 6:
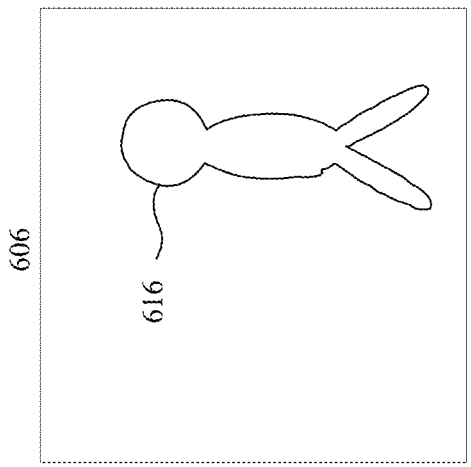
FIG. 6 illustrates an example of an input image and corresponding masks outputs, according to an embodiment of the present disclosure.
Figure 6:
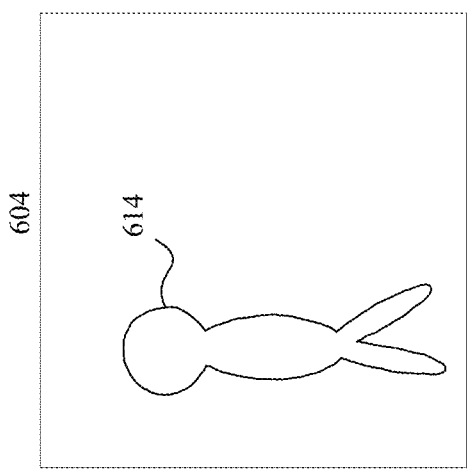
Figure 6:
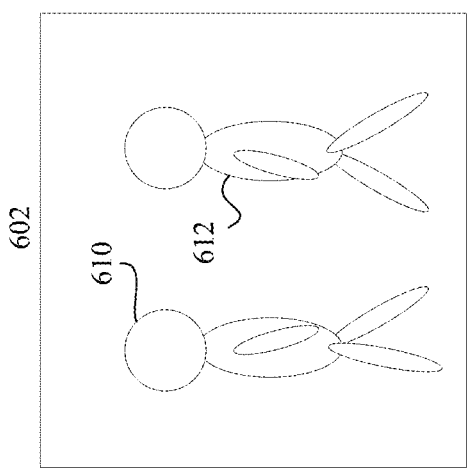

The one or more instance mask outputs 146 may include masks of all predicted objects in an image (e.g., image 110). In an embodiment, each mask may have the same size as the input image. In some embodiments, each pixel value in an instance mask output may represent a probability that the pixel belongs to the corresponding object. FIG. 6 illustrates an example of an input image and corresponding mask outputs, according to an embodiment of the present disclosure.

Input image 602 may indicate two objects (e.g., person 610 and 612). According to an embodiment, the mask branch 108 may output one or more masks (e.g., 604 and 606) indicative of one or more objects in the input image. For example, output mask 604 indicates a mask 614 corresponding to an object (e.g., person 610) in the image 602. Similarly, output mask 606 indicates a mask 616 corresponding to an object (e.g., person 612) in the image 602.

In an embodiment, the tracking and matching may be performed, via tracking and matching module 152, as a post-processing step. The tracking and matching module 152 may use one or more segmentation model outputs, i.e., instance category scores (e.g., category output 126), mask outputs (e.g., instance mask outputs 146) and instance embedding information 134, to perform one or more of tracking and matching functionalities.

As may be appreciated by a person skilled in the art, carrying out the matching functionality within the system pipeline 100 may limit the tracking range due to memory constraints. Accordingly, to be able to track for long term, in some embodiments, the tracking and matching functionality may be performed outside the segmentation model (system pipeline 100). In some embodiments, the tracking and matching may use Kalman Filter (tracking) and Cosine Similarity (matching) as may be appreciated by a person skilled in the art. Kalman Filter and Cosine Similarity are described in Nicolai Wojke, Alex Bewley, Dietrich Paulus, "Simple Online and Realtime Tracking with a Deep Association Metric", In: Proc. IEEE International Conference on Image Processing (ICIP), 2017. Accordingly, embodiments described herein may provide for tracking and matching functionalities.

Figure 7:
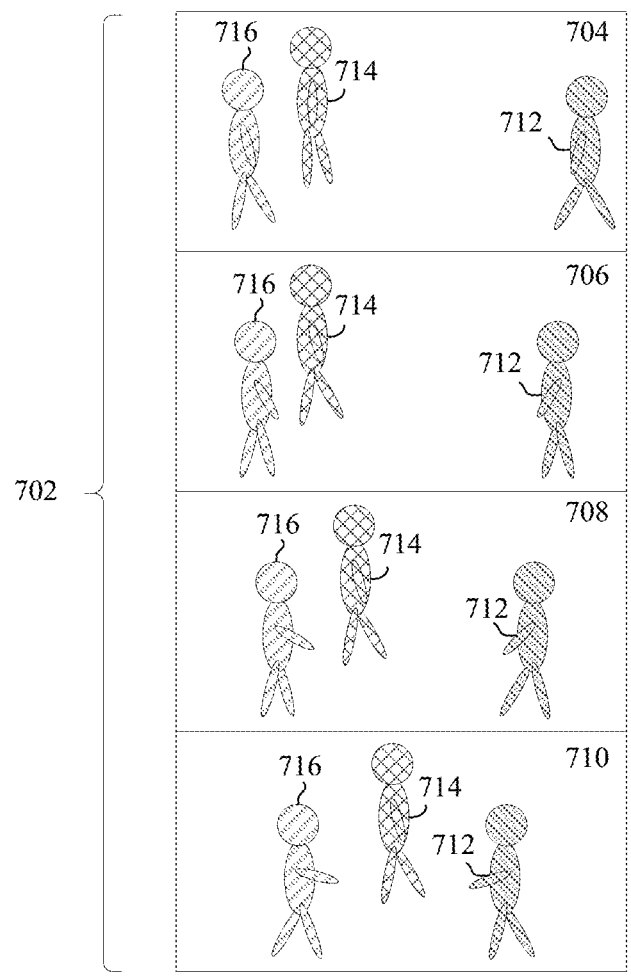
FIG. 7 illustrates an example of tracking and matching, according to an embodiment of the present disclosure.

FIG. 7 illustrates an example of tracking and matching, according to an embodiment of the present disclosure. FIG. 7 illustrates four consecutive frames 704, 706, 708 and 710 of a video 702 that may be fed into system pipeline 100. According to an embodiment, the category branch 104 may generate one or more grid-based category outputs. The Re-ID branch may generate embedding information associated with each object (e.g., person 712, 714, 716) in each frame of the video 702. The mask branch 108 may generate a mask for each object (e.g., person 712, 714, 716) in each frame of the video 702. In some embodiments, the tracking matching module 152 may use the system pipeline outputs including one or more of grid-based category score outputs, embedding information 134, and instance masks 146 for assigning to each object a unique consistent ID for all frames in the entire video 702.

Accordingly, in an embodiment, an object (e.g., person 712) in the video 702 (comprising frames 704, 706, 708, and 710) may be matched and tracked. The object (e.g., person 712) may be tracked across one or more frames via its associated unique consistent ID. As the object's (e.g., person 712's) position in the frame is changed from one frame to the next successive frame, the matching and tracking module 152 may track the object. The unique consistent ID of the object (e.g., person 312) remains unchanged from one frame to the next successive frame.

In some embodiments, the backbone network 102 may be the backbone used in SOLO. In some embodiments, the backbone network 102 may be the Deep Layer Aggregation network (DLA34) described in Lin, et al., "Focal Loss for Dense Object Detection", arXiv technical report (arXiv 1708.02002). As may be appreciated by a person skilled in the art, DLA34 may allow a single scale feature map to efficiently aggregate high-level and low-level semantic features, which may be more efficient than the backbone network used in SOLO. In addition, using DLA34 as the backbone network may be adequate considering the balance between performance and complexity. However, system pipeline 100 is not dependent on nor limited to DLA34.

Figure 8:
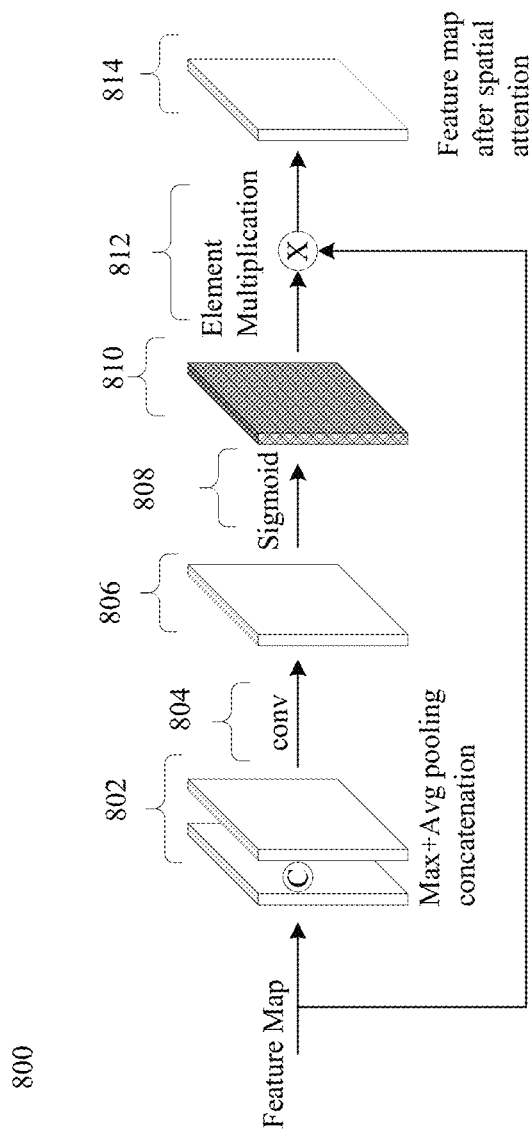
FIG. 8 illustrates an example of spatial attention module, according to an embodiment of the present disclosure.

FIG. 8 illustrates an example of spatial attention module, according to an embodiment of the present disclosure. The spatial attention module 800 may be an example implementation of the spatial attention module 122. As may be appreciated by a person skilled in the art, the attention mechanism has been used in the computer vision field. In an embodiment, the spatial attention module 800 may allow a system, e.g., system pipeline 100, to assign different weights for different areas. For example, image areas that contain objects may be assigned a higher weight. The spatial attention module 800 may be similar to the design described in Sanghyun Woo, Jongchan Park, Joon-Young Lee, In So Kweon, "CBAM: Convolutional Block Attention Module", In: Proc. European Conference on Computer Vision (ECCV), 2018. In an embodiment, feature maps or image features from the backbone network 102 may undergo max pooling operation and average pooling operation 802. Outputs of the max pooling operation and the average pooling operation may be concatenated to obtain concatenated feature maps. The concatenated feature maps may then be fed through several convolution operations 804 to generate the new feature maps 806. The feature maps 806 may then be fed through sigmoid activation function 808 and generate a one-channel attention feature map 810. Thereafter, the feature maps or image features from the backbone network 102 may be multiplied element-by-element with the attention feature map 810 to generate the final feature maps 814. The final feature maps are amplified representations of the features of the grids that correspond to object centers. The final feature maps may refer to the feature map outputs that are fed to the category feature module 124.

As may be appreciated by a person skilled in the art, there may be other ways of implementing the spatial attention module 122 not limited to the example implementation 800.

Figure 9:
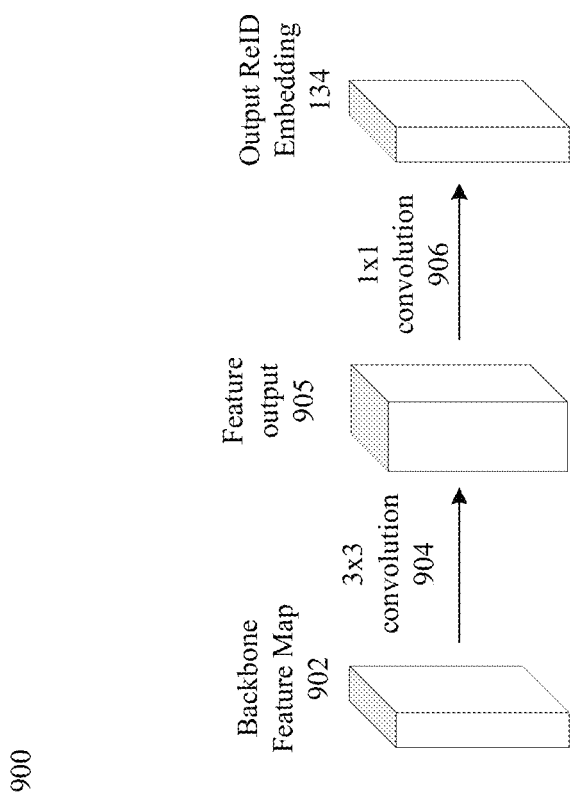
FIG. 9 illustrates an example of Re-ID branch implementation, according to an embodiment of the present disclosure.

FIG. 9 illustrates an example of Re-ID branch implementation, according to an embodiment of the present disclosure. As described herein, the Re-ID branch 106 may be added in parallel with the category branch 104 and the mask branch 108. As may be appreciated by a person skilled in the art, Re-ID branch 106 further supports the tracking functionality of the system pipeline 100, i.e., the instance embedding information may be obtained simultaneously with category information and mask information. As such, the system pipeline 100 may be more efficient than the existing two-stage solutions which perform detection first followed by embedding information extraction and tracking. In an embodiment, the ReID branch 106 may comprise a shallow network of two layers: one 3×3 convolution layer 904 (shallow network) followed by 1×1 convolution layer 906.

In an embodiment, the Re-ID feature module 132 may comprise a 3×3 convolution and a 1×1 convolution. Accordingly, the backbone feature map 902 (from the backbone network 102) may be fed into the 3×3 convolution network 904 to generate a feature output 905. The feature output 905 is then fed into a 1×1 convolution to generate Re-ID embedding outputs 134.

While the described implementation in reference to FIG. 9 may provide reasonable results, the Re-ID branch 106 is not limited to the implementation 900. Rather, a person skilled in the art may appreciate that, in some embodiments, the number of convolution layers or the convolution kernel size or both may be increased.

Existing segmentation algorithms still have limitations. They suffer from either over-segmentation or under-segmentation artifacts. Some applications are more sensitive to under-segmentation. In image or video inpainting applications, under-segmentation creates very annoying artifacts. On the other hand, over-segmentation is much more forgiving in most of the inpainting algorithms. Further, most existing algorithms perform dilation which enlarges the inpainting masks before inpainting.

Instead of applying dilation as a post-processing step, embodiments may provide for generating semantically dilated masks directly in the segmentation model. In some embodiments, Tversky loss is used to train the mask branch network 108 to generate semantically dilated masks. As may be appreciated by a person skilled in the art, loss calculations may be performed for training corresponding weights of related networks, as described herein. Accordingly, network weight training, via loss calculations, may result in improved network outputs.

Tversky loss may be represented via the following two equations:

$$T_I = \frac{T_P}{T_P + \alpha F_N + \beta F_P} \quad (1)$$

$$T_L = 1 - T_I \quad (2)$$

where: $T_P$ may represent the true positive, $F_N$ may represent the false negative, and $F_P$ may represents false positive. Further, $\alpha$ and $\beta$ may represent weighting factors, which control weighting on false negative and false positive. In some embodiments, $\alpha=0.1$ and $\beta=0.9$.

Figure 10:
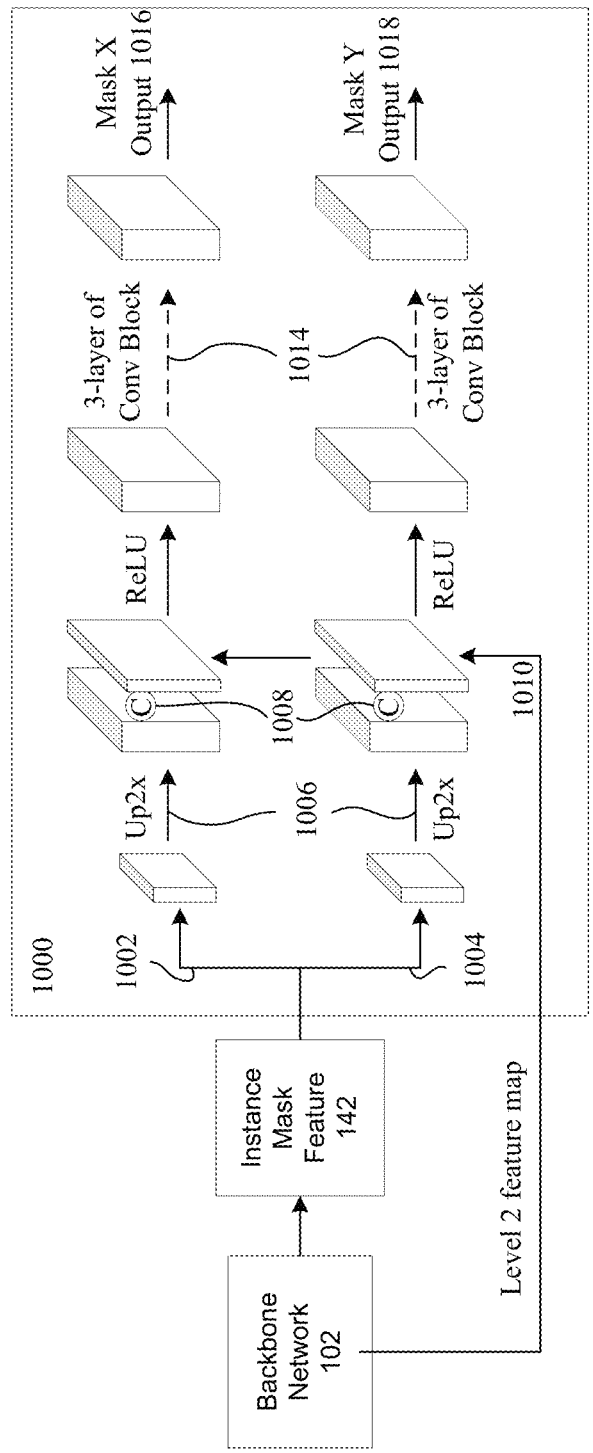
FIG. 10 illustrates an example implementation of the mask refinement module, according to an embodiment of the present disclosure.

The mask refinement module 144 may provide for improved mask quality, including improved mask boundaries. FIG. 10 illustrates an example implementation of the mask refinement module, according to an embodiment of the present disclosure.

In some embodiments, the mask refinement architecture 1000 may use low-level features. In some embodiments, the mask refinement architecture 1000 may use mask edges to calculate the loss in training the mask refinement module. Using edge loss may further improve mask boundary accuracy in the make branch 108. Edge loss is described in Roland S. Zimmermann and Julien N. Siems, "Faster Training of Mask {R-CNN} by Focusing on Instance Boundaries", Arxiv, http://arxiv.org/abs/1809.07069, 2018.

In some embodiments, the mask refinement architecture 1000 may use low-level features to obtain improved (refined) masks since the low-level feature maps may provide more useful mask boundary information.

In some embodiments, the mask refinement architecture 1000 may use a Sobel filter to extract edge information (e.g., apply a Sobel filter on the masks), thereby obtaining edges of the predicted masks and ground-truth masks. Sobel filter is described in Roland S. Zimmermann and Julien N. Siems, "Faster Training of Mask {R-CNN} by Focusing on Instance Boundaries", Arxiv, http://arxiv.org/abs/1809.07069, 2018.

In some embodiments, the Sobel filter used may be a 3×3 Sobel filter. The 3×3 Sobel filter may calculate the horizontal gradient ($G_x$) and the vertical gradient ($G_y$) according to the following equations:

$$G_x = \begin{bmatrix} +1 & 0 & -1 \\ +2 & 0 & -2 \\ +1 & 0 & -1 \end{bmatrix} * A \quad (3)$$

$$G_y = \begin{bmatrix} +1 & +2 & +1 \\ 0 & 0 & 0 \\ -1 & -2 & -1 \end{bmatrix} * A \quad (4)$$

where A may denote the mask and * may represent a convolution operation.

In some embodiments, smoothed L1 loss (for edge loss metric) may be used for improved results, as may be appreciated by a person skilled in the art. Smoothed L1 loss is described in Ren, et al., "Faster R-CNN: Towards Real-Time Object Detection with Region Proposal Networks", https://arxiv.org/abs/1506.01497. In some embodiments, during training the mask refinement module, the edge loss weights may be adjusted to so that the edge loss values are in the similar range as the mask loss values for the ease of the training.

Referring to FIG. 10, inputs to the mask refinement architecture (1000) (e.g., outputs from the instance mask feature module) may comprise two branches, one in X direction (horizontal) 1002, and one in the Y direction (vertical) 1004. The two branches may be referred to as a decoupled SOLO, as may be appreciated by a person skilled in the art.

In some embodiments, each branch 1002 and 1004 is first up-sampled 1006 by a scale of two. Then, the up-sampled masks may be concatenated 1008 with low-level features obtained from the backbone network. In some embodiments, the low-level features may refer to Level2 feature map 1010 from the backbone network 102 (e.g., DLA34). Then these concatenated feature maps may be fed through several convolutional blocks 1014 and generate the final refined mask outputs 1016 and 1018.

In some embodiments, each convolutional block 1014 may use 3×3 kernel size and Rectified Linear Units (ReLU) as the activation function. ReLU activation function may be known by a person skilled in the art and is described in, for example, Abien Fred Agarap, "Deep Learning using Rectified Linear Units (ReLU)", https://arxiv.org/abs/1803.08375. In some embodiments, the convolution blocks 104 may use deformable convolution, group normalization and ReLU.

While the illustrated convolutional block may provide for an adequate balance between computational complexity and mask quality, a person skilled in the art may appreciate that, in some embodiments, different convolutional blocks from those illustrated may be used. As described herein, embodiments described herein may use low-level features for mask refinement.

Figure 11:
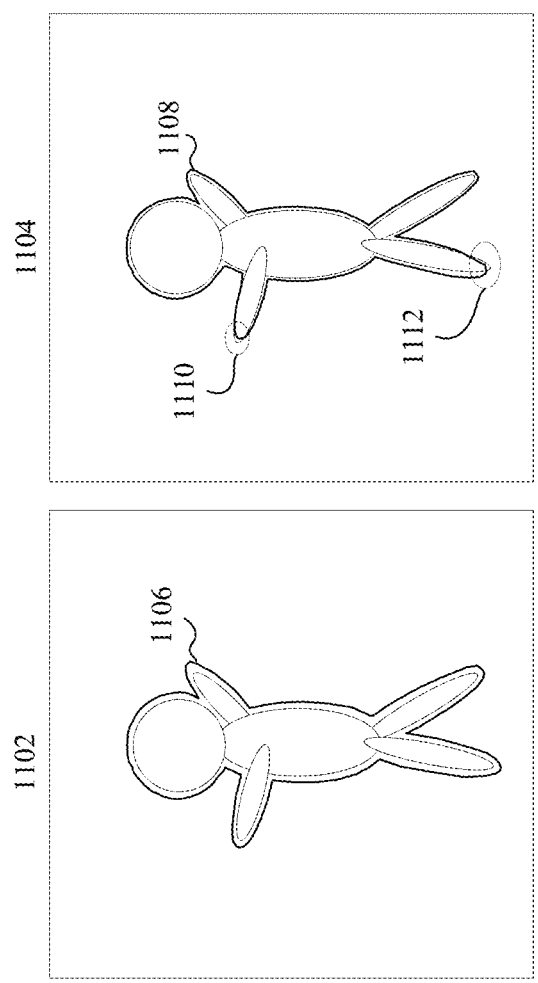
FIG. 11 illustrates a mask comparison, according to an embodiment of the present disclosure.

FIG. 11 illustrates a mask obtained from instance mask feature 142, which is trained using Tversky loss, and a mask generated by the mask refinement module 144, according to an embodiment of the present disclosure. Image 1102 illustrates a mask 1106 generated from the mask generation network that is trained using Tversky loss 208 and image 1004 illustrates a mask 1108 generated using mask refinement network which is trained using Dice loss and Edge loss. Although the refined masks have better boundary accuracy compared to the semantic dilated mask 1106, the refined masks 1108 may have areas of under-segmentation 1110 and 1112. Whereas, mask 1106 generated from the mask generation network trained using Tversky loss may provide for a mask with a more adequate covering.

Embodiments described herein may provide for an efficient segmentation and tracking framework that is based on a one-stage segmentation and tracking network. Embodiments described herein may be suitable for applications that are more sensitive to under-segmentation artifacts. Embodiments described herein may provide for more accurate-boundary masks (e.g., covering finger tips and shoe toes). Embodiments described herein may leverage different training losses during training to train the network to obtain improved results, thereby, obviating the need for additional computation (e.g., post processing dilation). Embodiments described herein may provide for enhanced dilation via dilating instance masks in a more semantic approach such that only needed areas are dilated. Accordingly, embodiments described herein may provide for improved dilation operation via end-to-end training, thereby, avoiding over-dilations on areas that are not required.

Figure 12:
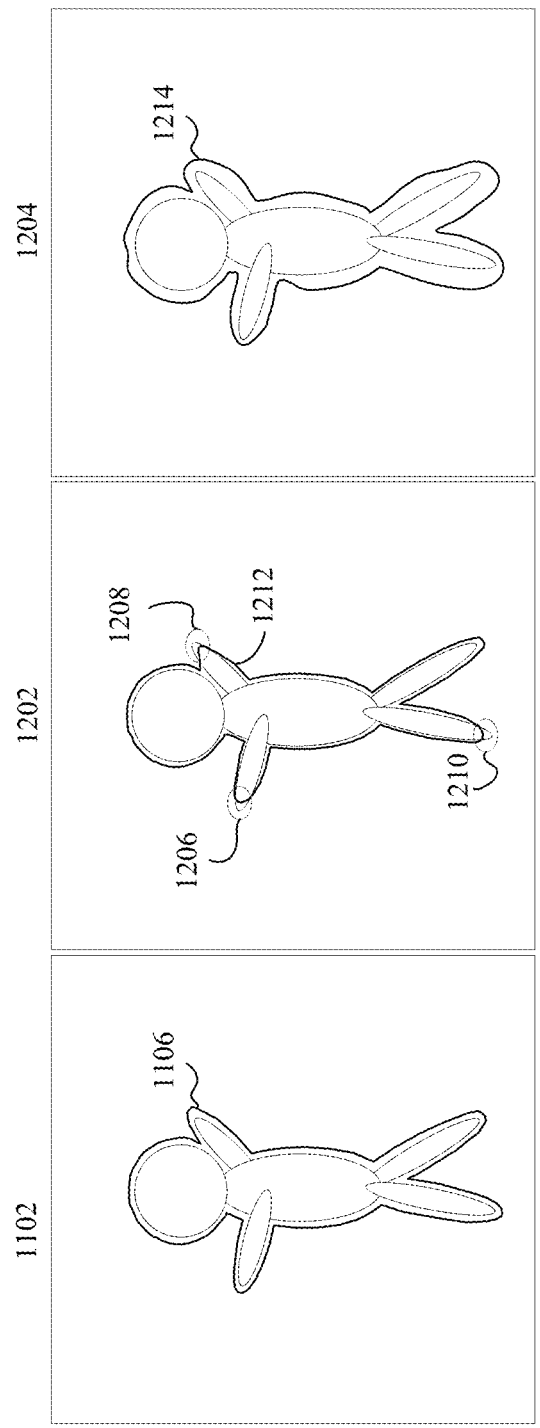
FIG. 12 illustrates another mask comparison according to an embodiment of the present disclosure.

FIG. 12 illustrates a mask comparison according to an embodiment of the present disclosure. Image 1102 illustrates a mask 1106 obtained via the mask branch 108 trained using Tversky loss. Image 1202 illustrates a mask 1212 obtained via the mask branch not trained using Tversky loss. As illustrated, mask 1212 results in under segmentation in which the fingers 1206 and 1208 and toes 2320 are not detected. Image 1204 illustrates a mask 1214 obtained using dilation as post-processing to cover the fingers and toes. As illustrated, although post-processing dilation may cover fingers and toes, it further leads to over-dilation of the other areas.

Embodiments described herein may provide for a one-stage segmentation and tracking network which may compute instance embedding vectors simultaneously. Embodiments described herein may further provide for improved mask refinement via concatenating low-level feature maps with original masks. Low-level feature maps may refer to pixel-level information (e.g., edge information) as may be appreciated by a person skilled in the art.

Embodiments described herein may further avoid under-segmentation artifact via using Tversky loss in training instance segmentation to semantically dilate the instance mask in the end-to-end model. Using Tversky loss in instance segmentation to semantically dilate the instance mask may provide for a more efficient and accurate result (as illustrated for example in FIG. 12).

Embodiments described herein are not limited to instance segmentation and tracking, rather, embodiments described herein may extend to semantic segmentation and tracking. Embodiments described herein may further extend to any other video object segmentation framework, as may be appreciated by a person skilled in the art.

A neural network (e.g., backbone network 102) may comprise a plurality of neural cells. The neural cell may be an operation unit that uses $x_s$ and an intercept of 1 as inputs. An output from the operation unit may be:

$$h_{W,b}(x) = f(W^T x) = f\left(\sum_{s=1}^{n} W_s x_s + b\right) \quad (1)$$

where s=1, 2, ... n, and n is a natural number greater than 1, $W_s$ is a weight of $x_s$, b is an offset of the neural cell, and $f$ is an activation function (activation functions) of the neural cell and used to introduce a nonlinear feature to the neural network, to convert an input signal of the neural cell to an output signal. The output signal of the activation function may be used as an input to a following convolutional layer. The activation function may be a sigmoid function. The neural network is a network formed by joining a plurality of the foregoing single neural cells. In other words, an output from one neural cell may be an input to another neural cell. An input of each neural cell may be associated with a local receiving area of a previous layer, to extract a feature of the local receiving area. The local receiving area may be an area consisting of several neural cells.

A deep neural network (DNN) is also referred to as a multi-layer neural network and may be understood as a neural network with a plurality of hidden layers. The "plurality" herein does not have a special metric. The DNN is divided according to positions of different layers. The neural networks in the DNN may be classified into three categories: an input layer, a hidden layer, and an output layer. Generally, a first layer is the input layer, a final layer is the output layer, and middle layers are all hidden layers. A full connection between layers refers to adjacent layers in the DNN where each node in one of the layers is connected to each of the nodes in the next layer. A neural cell at an $i^{th}$ layer is connected to any neural cell at an $(i+1)^{th}$ layer.

Briefly, the work at each layer may be indicated by the following linear relational expression $\vec{y}=\alpha(W\vec{x}+\vec{b})$, where $\vec{x}$ is an input vector, $\vec{y}$ is an output vector, $\vec{b}$ is an offset vector, W is a weight matrix (also referred to as a coefficient), and a is an activation function. At each layer, only such a simple operation may be performed on an input vector $\vec{x}$, to obtain an output vector $\vec{y}$. Since there may be a large quantity of layers in the DNN, there may also be a large quantity of coefficients W and offset vectors $\vec{b}$. Definitions of these parameters in the DNN are as follows.

The coefficient W is used as an example. It is assumed that in a three-layer DNN, a linear coefficient from a fourth neural cell at a second layer to a second neural cell at a third layer is defined as $W_{24}^3$. The superscript 3 represents a layer of the coefficient W, and the subscript is corresponding to the output layer-3 index 2 and the input layer-2 index 4. Accordingly, a coefficient from a $k^{th}$ neural cell at an $(L-1)^{th}$ layer to a $j^{th}$ neural cell at an $L^{th}$ layer is defined as $W_{jk}^L$. It should be noted that there is no W parameter at the input layer. In the deep neural network, more hidden layers enable a network to depict a complex situation in the real world. In theory, a model with more parameters is more complex, has a larger "capacity", and indicates that the model can complete a more complex learning task. Training of the deep neural network is a weight matrix learning process. A final purpose of the training is to obtain a trained weight matrix (a weight matrix consisting of weights W of a plurality of layers) of all layers of the deep neural network.

A convolutional neural network (CNN) is a deep neural network with a convolutional structure. The convolutional neural network may include a feature extractor comprising a convolutional layer and a sub-sampling layer. The feature extractor may be considered as a filter. A convolution process may be considered as performing convolution on an input (e.g., image or video) or a convolutional feature map (feature map) by using a trainable filter. The convolutional layer indicates a neural cell layer at which convolution processing is performed on an input signal in the convolutional neural network. At the convolutional layer of the convolutional neural network, one neural cell may be connected only to neural cells at some neighboring layers. One convolutional layer usually includes several feature maps, and each feature map may be formed by some neural cells arranged in a rectangle. Neural cells at a same feature map share a weight. The shared weight herein is a convolutional kernel. The shared weight may be understood as being unrelated to a manner and a position of image information extraction. A hidden principle is that statistical information of a part of an image (or a section of a video) is the same as that of another part. This indicates that image (or video) information learned in a first part may also be used in another part. Therefore, in all positions on the image (or the section of a video), same image (or video) information obtained through same learning may be used. A plurality of convolutional kernels may be used at a same convolutional layer to extract different image information. Generally, a larger quantity of convolutional kernels indicates that richer image (or video) information is reflected by a convolution operation.

A convolutional kernel may be initialized in a form of a matrix of a random size. In a training process of the convolutional neural network, an appropriate weight may be obtained by performing learning on the convolutional kernel. In addition, a direct advantage brought by the shared weight is that a connection between layers of the convolutional neural network is reduced and a risk of overfitting is lowered.

In the process of training a deep neural network, to enable the deep neural network to output a predicted value that is as close to a truly desired value as possible, a predicted value of a current network and a truly desired target value may be compared, and a weight vector of each layer of the neural network is updated based on a difference between the predicted value and the truly desired target value. There is usually an initialization process before a first update. For example, a parameter may be preconfigured for each layer of the deep neural network. If the predicted value of a network is excessively high, the weight vector may be continuously adjusted to lower the predicted value, until the neural network can predict the truly desired target value. Therefore, an approach to compare the difference between a predicted value and target value may be via a loss function or an objective function. The loss function and the objective function may be used to measure the difference between a predicted value and a target value. For example, the loss function is used as an example. A higher output value (loss) of the loss function indicates a greater difference. In this case, training the deep neural network is a process of minimizing the loss.

In the convolutional neural network, an error back propagation (BP) algorithm may be used in a training process to revise a value of a parameter, e.g., a weight vector, of the network so that a re-setup error loss of the network. An error loss is generated in a process from forward propagation of an input signal to signal output. The parameter of the network is updated through back propagation of error loss information, so that the error loss is converged. The back propagation algorithm is a back propagation movement dominated by an error loss, and is intended to obtain a most optimal network parameter, for example, a weight matrix.

A pixel value of an image or a frame in a video is a long integer indicating a color. It may be a red, green, and blue (RGB) color value, where Blue represents a component of a blue color, Green represents a component of a green color, and Red represents a component of a red color.

Figure 13:
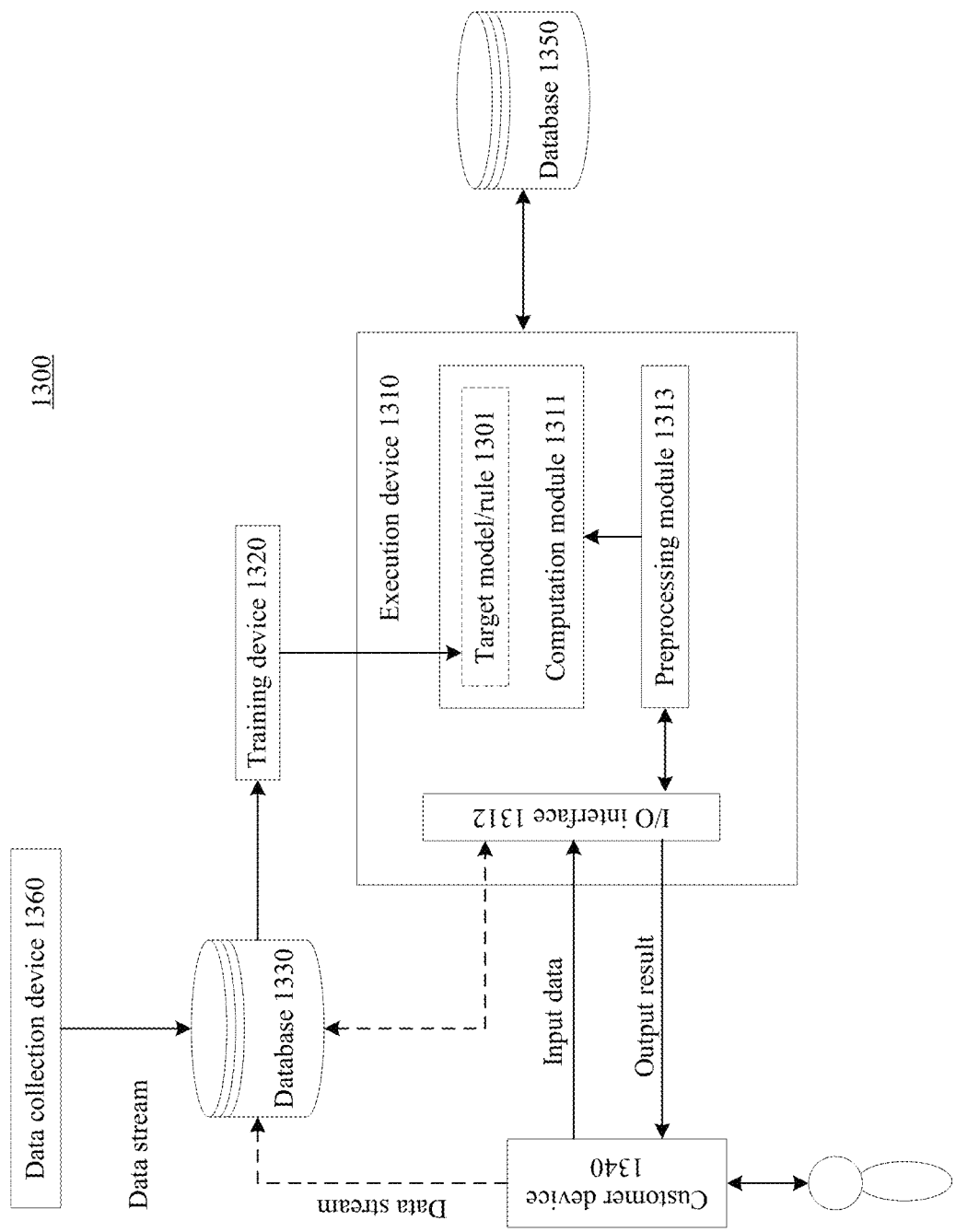
FIG. 13 illustrates a schematic structural diagram of a system architecture according to an embodiment of the present disclosure.

FIG. 13 is a schematic structural diagram of a system architecture according to an embodiment of the present disclosure. As shown in the system architecture 1300, a data collection device 1360 is configured to collect training data and store the training data into a database 1330. The training data may include for example a set of N images and their corresponding ground truth label (e.g., category label, Re-ID label, mask label). A training device 1320 generates a target model/rule 1301 based on the training data maintained in the database 1330. The target model/rule 1301 may refer to the trained network described herein, e.g., backbone network, and other networks used in the different branches.

Optionally, the one or more methods described herein may be processed by a CPU, or may be jointly processed by a CPU and a GPU, or may not be processed by a GPU, but processed by another processor that is applicable to neural network computation. This is not limited in this application.

The target model 1301 may be used for downstream tasks (e.g., one or more embodiments described herein (e.g., generating one or more of category output 126, masks 146 or 143, Re-ID embedding output 134; performing tracking and matching functionality via the tracking and matching module 152). A downstream task may be for example, a video classification task, which may be similar to an image classification task by replacing images with videos. In an embodiment, the input data to the model may be videos and the outputs may be predicted labels from the model. The predicted labels and the ground-truth labels may be used to obtain the losses (e.g., focal loss, cross-entropy, Tversky, edge loss, dice loss) described herein, which is used to update the model parameters.

In some embodiments, the training data maintained in the database 1330 is not necessarily collected by the data collection device 1360, but may be obtained through reception from another device. it should be noted that the training device 1320 does not necessarily perform the training with the target model/rule 1301 fully based on the training data maintained by the database 1330, but may perform model training on training data obtained from a cloud end or another place. The foregoing description shall not be construed as a limitation to this embodiment of the disclosure.

The target module/rule 1301 obtained through training by the training device 1320 may be applied to different systems or devices, for example, applied to an execution device 1310. The execution device 1310 may be a terminal, for example, a mobile terminal, a tablet computer, a notebook computer, AR/VR, or an in-vehicle terminal, or may be a server, a cloud end, or the like. The execution device 1310 is provided with an I/O interface 1312, which is configured to perform data interaction with an external device. A user may input data to the I/O interface 1312 by using a customer device 1340.

A preprocessing module 1313 may be configured to perform preprocessing based on the input data (for example, one or more video sets) received from the I/O interface 1312. For example, the input video segments may go through some preprocessing e.g., color jittering, random cropping, random resizing, etc.

In a related processing process in which the execution device 1310 performs preprocessing on the input data or the computation module 1311 in the execution device 110 performs computation, the execution device 1310 may invoke data, code, or the like from a data storage system 1350, to perform corresponding processing, or may store, in a data storage system 1350, data, an instruction, or the like obtained through corresponding processing.

The I/O interface 1312 may return a processing result to the customer device 1340 and provides the processing result to the user. It should be noted that the training device 1320 may generate a corresponding target model/rule 1301 for different targets or different tasks (tasks described herein) based on different training data. Tasks may include for example performing one or more embodiments described herein (e.g., generating one or more of category output 126, masks 146 or 143, Re-ID embedding output 134; performing tracking and matching functionality via the tracking and matching module 152).

The corresponding target model/rule 1301 may be used to implement the foregoing target or accomplish the foregoing tasks, to provide a desired result for the user.

In some embodiments, the user may manually specify input data by performing an operation on a screen provided by the I/O interface 1312. In another case, the customer device 1340 may automatically send input data to the I/O interface 1312. If the customer device 1340 needs to automatically send the input data, authorization of the user needs to be obtained. The user can specify a corresponding permission in the customer device 1340. The user may view, in the customer device 1340, the result output by the execution device 1310. A specific presentation form may be display content, a voice, an action, and the like. In addition, the customer device 1340 may be used as a data collector, to collect, as new sampling data, the input data that is input to the I/O interface 1312 and the output result that is output by the I/O interface 1312 that are shown in FIG. 1, and store the new sampling data into the database 1330. The data may not be collected by the customer device 1340, but the I/O interface 1312 may directly store, as new sampling data into the database 1330, the input data that is input to the I/O interface 1312 and the output result that is output from the I/O interface 1312.

It should be noted that FIG. 13 is merely a schematic diagram of a system architecture according to an embodiment of the present disclosure. Position relationships between the device, the component, the module, and the like that are shown do not constitute any limitation. For example, the data storage system 1350 is an external memory relative to the execution device 1310. In another case, the data storage system 1350 may be located in the execution device 1310.

As described herein, a convolutional neural network (CNN) is a deep neural network with a convolutional structure, and is a deep learning (deep learning) architecture. The deep learning architecture indicates that a plurality of layers of learning is performed at different abstraction layers by using, for example, a machine learning algorithm. As a deep learning architecture, the CNN is a feed-forward (feed-forward) artificial neural network. Each neural cell in the feed-forward artificial neural network may respond to an input (e.g., image or video) to the neural cell.

Figure 14:
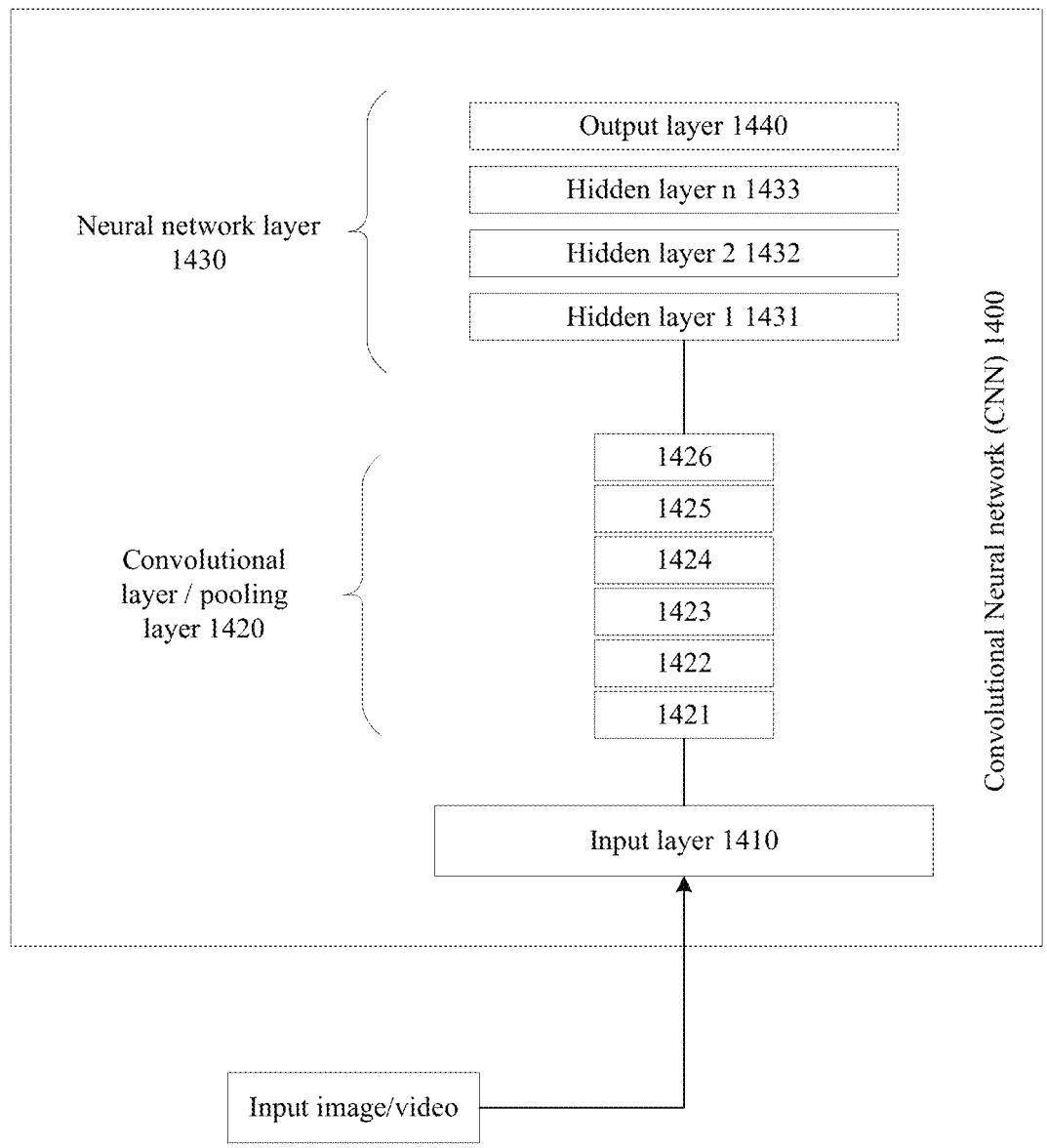
FIG. 14 illustrates a convolutional neural network (CNN) according to an embodiment of the present disclosure.

FIG. 14 illustrates a convolutional neural network (CNN) according to an embodiment of the present disclosure. A CNN 1400 may include an input layer 1410, a convolutional layer/pooling layer 1420 (the pooling layer may be optional), and a neural network layer 1430.

The convolutional layer/pooling layer 1420 may include, for example, layers 1421 to 1426. In an embodiment, the layer 1421 is a convolutional layer, the layer 1422 is a pooling layer, the layer 1423 is a convolutional layer, the layer 1424 is a pooling layer, the layer 1425 is a convolutional layer, and the layer 1426 is a pooling layer. In another embodiment, the layers 1421 and 1422 are convolutional layers, the layer 1423 is a pooling layer, the layers 1424 and 1425 are convolutional layers, and the layer 1426 is a pooling layer. In other words, an output from a convolutional layer may be used as an input to a following pooling layer, or may be used as an input to another convolutional layer, to continue a convolution operation.

The internal operating principles of a convolutional layer is described in reference to convolutional layer 1421, for example. The convolutional layer 1421 may include a plurality of convolutional operators. The convolutional operator may be referred to as a kernel. A role of the convolutional operator in a video segment (or one or more images) processing is equivalent to a filter that extracts specific information from a video segment matrix or the image equivalent. In essence, the convolutional operator may be a weight matrix. The weight matrix is usually predefined. In a process of performing a convolution operation on a video segment, the weight matrix is applied to all the images (frames) in the video segment at the same time. It is usually processed one pixel after another (or two pixels after two pixels . . . , depending on a value of a stride (stride)) in a horizontal and vertical directions on the input video (or one or more images), to extract a specific feature from the input. A size of the weight matrix needs to be related to a size of the images of the video segment. It should be noted that a depth dimension (depth dimension) of the weight matrix is the same as a depth dimension of the input video segment. Therefore, after convolution is performed on a single weight matrix, convolutional output with a single depth dimension is output. However, the single weight matrix is not used in most cases, but a plurality of weight matrices with same dimensions (row×column) are used, e.g., a plurality of same-model matrices. Outputs of all the weight matrices are stacked to form the depth dimension of the convolutional output feature map. It can be understood that the dimension herein is determined by the foregoing "plurality". Different weight matrices may be used to extract different features from the video segment. For example, one weight matrix is used to extract object edge information, another weight matrix is used to extract a specific color of the video, still another weight matrix is used to blur unneeded noises from the video, and so on. The plurality of weight matrices may have a same size (row×column). Feature graphs obtained after extraction performed by the plurality of weight matrices with the same dimension also have a same size, and the plurality of extracted feature graphs with the same size are combined to form an output of the convolution operation.

Weight values in weight matrices may be obtained through training. The weight matrices formed by the weight values obtained through training may be used to extract information from the input image or video, so that the convolutional neural network 1400 performs accurate prediction.

When the convolutional neural network 1400 has a plurality of convolutional layers, an initial convolutional layer (such as 1421) usually extracts a relatively large quantity of common features. The common feature may also be referred to as a low-level feature. As a depth of the convolutional neural network 1400 increases, a feature extracted by a deeper convolutional layer (such as 1426) becomes more complex, for example, a feature with high-level semantics or the like. A feature with higher-level semantics is more applicable to a to-be-resolved problem.

Because a quantity of training parameters usually needs to be reduced, a pooling layer usually needs to periodically follow a convolutional layer. For example, at the layers 1421 to 1426, one pooling layer may follow one convolutional layer, or one or more pooling layers may follow a plurality of convolutional layers. The pooling layer may be used to reduce a spatial or temporal size of feature maps (e.g., in a video processing process). The pooling layer may include an average pooling operator and/or a maximum pooling operator, to perform sampling on the input feature map to obtain an output feature map of a relatively small size. The average pooling operator may calculate a pixel value in the input feature map within a specific range, to generate an average value as an average pooling result. The maximum pooling operator may obtain, as a maximum pooling result, a pixel with a largest value within the specific range. In addition, just like the size of the weight matrix in the convolutional layer needs to be related to the size of the feature map, an operator at the pooling layer also needs to be related to the size of the feature map. The size of the output feature map after processing by the pooling layer may be smaller than a size of the input feature map to the pooling layer. Each pixel in the output feature map by the pooling layer indicates an average value or a maximum value of a subarea corresponding to the input feature map to the pooling layer.

After an input, e.g., a video segment, is processed by the convolutional layer/pooling layer 1420, the convolutional neural network 1400 may still be incapable of outputting a desired information. The convolutional layer/pooling layer 1420 may only extract a feature, and reduce a parameter brought by the input. However, to generate final output information (desired category information or other related information), the convolutional neural network 1400 may need to generate an output of a quantity of one or a group of desired categories by using the neural network layer 1430. Therefore, the neural network layer 1430 may include a plurality of hidden layers (such as 1431, 1432, to 1433 (represent nth hidden layer)) and an output layer 1440. A parameter included in the plurality of hidden layers may be obtained by performing pre-training based on related training data of one or more embodiments described herein (e.g., generating one or more of category output 126, masks 146 or 143, Re-ID embedding output 134; performing tracking and matching functionality via the tracking and matching module 152).

The output layer 1440 follows the plurality of hidden layers in the neural network layers 1430. The output layer 1440 is a final layer in the entire convolutional neural network 1400. The output layer 1440 may have a loss function which may be used to calculate a prediction error. Once forward propagation (propagation in a direction from 1410 to 1440 is forward propagation) is complete in the entire convolutional neural network 1400, back propagation (propagation in a direction from 1440 to 1410 is back propagation) starts to update the weight values and offsets of the foregoing layers, to reduce a loss of the convolutional neural network 1400 and an error between an ideal result and a result output by the convolutional neural network 1400 by using the output layer.

Figure 15:
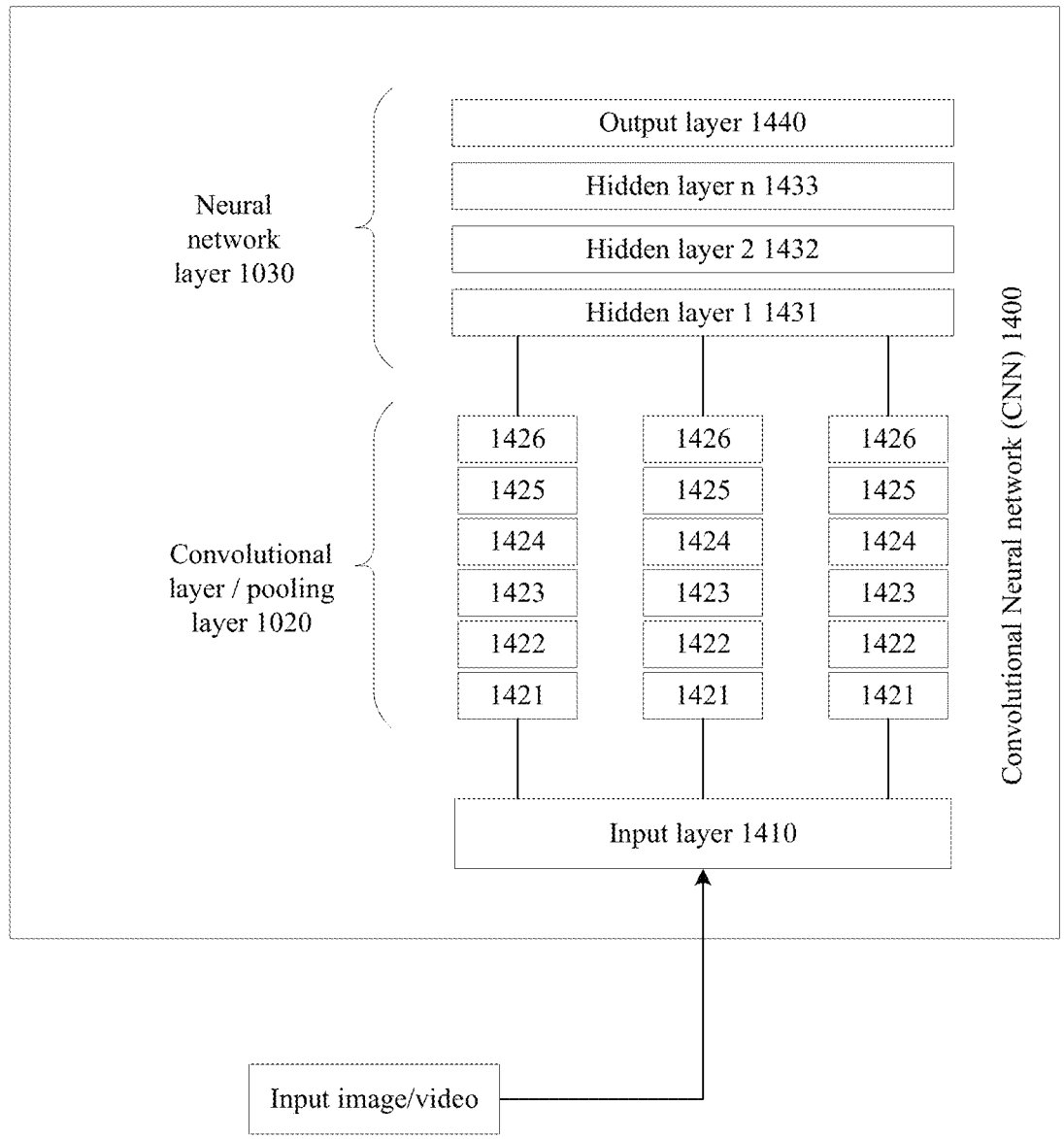
FIG. 15 illustrates another convolutional neural network (CNN) according to an embodiment of the present disclosure.

It should be noted that the convolutional neural network 1400 is merely used as an example of a convolutional neural network. In actual application, the convolutional neural network may exist in a form of another network model. For example, a plurality of convolutional layers/pooling layers shown in FIG. 15 are parallel, and separately extracted features are all input to the neural network layer 1430 for processing.

Figure 16:
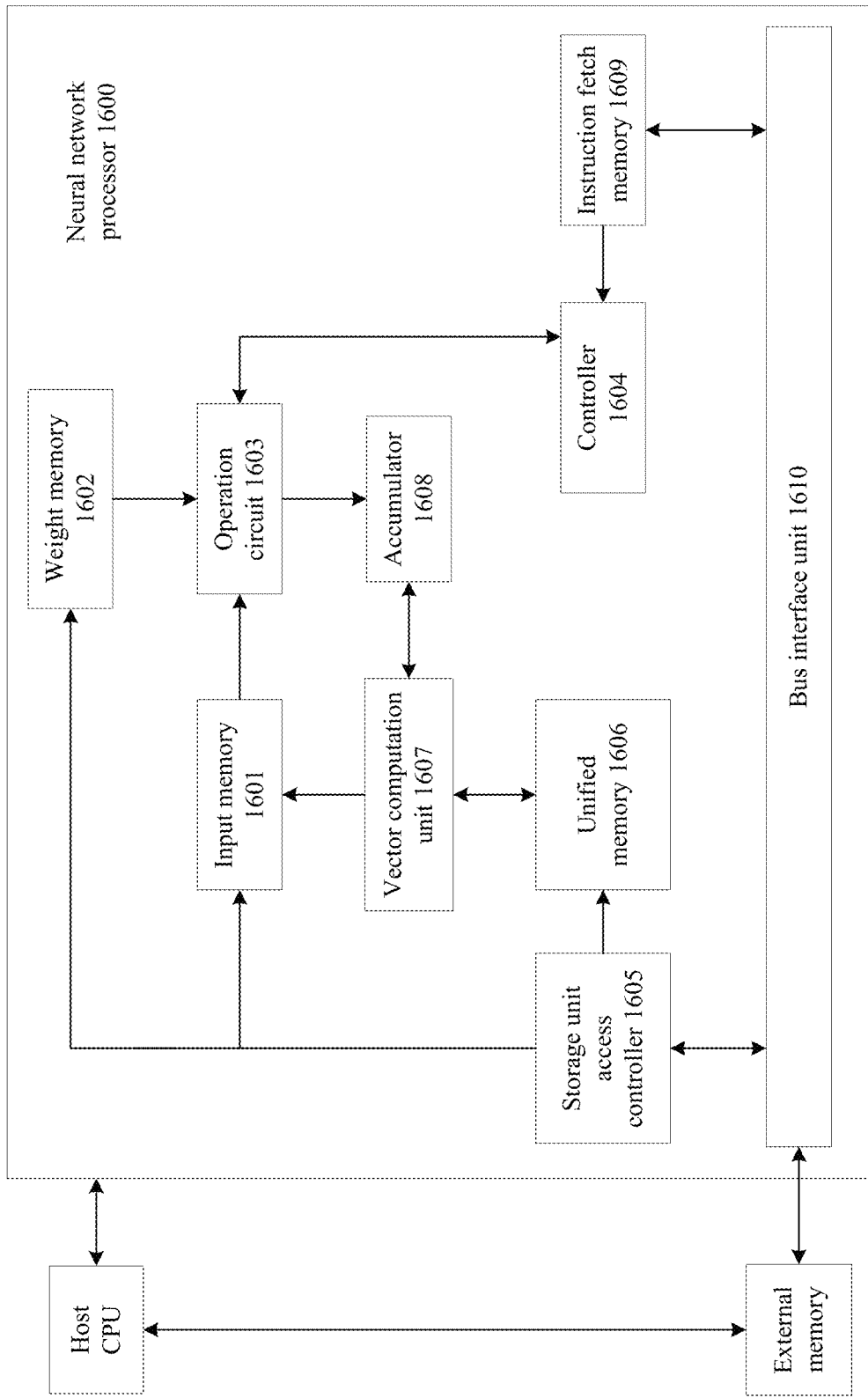
FIG. 16 illustrates a schematic diagram of a hardware structure of a chip according to an embodiment of the present disclosure.

FIG. 16 illustrates a schematic diagram of a hardware structure of a chip according to an embodiment of the present disclosure. The chip includes a neural network processor 1600. The chip may be provided in the execution device 1310 shown in FIG. 13, to perform computation for the computation module 1311. Alternatively, the chip may be provided in the training device 1320 shown in FIG. 13, to perform training and output the target model/rule 1301. All the algorithms of layers of the convolutional neural network shown in FIG. 14 and FIG. 15 may be implemented in the chip shown in FIG. 15.

The neural network processor 1600 may be any processor that is applicable to massive exclusive OR operations, for example, an NPU, a TPU, a GPU, or the like. The NPU is used as an example. The NPU may be mounted, as a coprocessor, to a host CPU, and the host CPU may allocate a task to the NPU. A core part of the NPU is an operation circuit 1603. A controller 1604 controls the operation circuit 1603 to extract matrix data from memories (1601 and 1602) and perform multiplication and addition operations.

In some implementations, the operation circuit 1603 internally includes a plurality of processing units (e.g., Process Engine, PE). In some implementations, the operation circuit 1603 is a bi-dimensional systolic array. In addition, the operation circuit 1603 may be a unidimensional systolic array or another electronic circuit that can implement a mathematical operation such as multiplication and addition. In some implementations, the operation circuit 1603 is a general matrix processor.

For example, it is assumed that there are an input matrix A, a weight matrix B, and an output matrix C. The operation circuit 1603 may obtain, from a weight memory 1602, weight data of the matrix B, and cache the data in each PE in the operation circuit 1603. The operation circuit 1603 may obtain input data of the matrix A from an input memory 1601, and perform a matrix operation based on the input data of the matrix A and the weight data of the matrix B. An obtained partial or final matrix result may be stored in an accumulator (accumulator) 1608.

A unified memory 1606 may be configured to store input data and output data. Weight data may be directly moved to the weight memory 1602 by using a storage unit access controller (e.g., Direct Memory Access Controller, DMAC) 1605. The input data may also be moved to the unified memory 1606 by using the DMAC.

A bus interface unit (BIU) 1610 may be used for interaction between the storage unit access controller (e.g., DMAC) 1605 and an instruction fetch memory (Instruction Fetch Buffer) 1609. The bus interface unit 1610 may further be configured to enable the instruction fetch memory 1609 to obtain an instruction from an external memory. The BIU 1610 may further be configured to enable the storage unit access controller 1605 to obtain, from the external memory, source data of the input matrix A or the weight matrix B.

The storage unit access controller (e.g., DMAC) 1605 is mainly configured to move input data from an external memory DDR to the unified memory 1606, or move the weight data to the weight memory 1602, or move the input data to the input memory 1601.

A vector computation unit 1607 may include a plurality of operation processing units. If needed, the vector computation unit 1607 may perform further processing, for example, vector multiplication, vector addition, an exponent operation, a logarithm operation, or magnitude comparison, on an output from the operation circuit 1603. The vector computation unit 1607 may be used for computation at a non-convolutional layer or fully-connected layers (FC, fully connected layers) of a neural network. The vector computation unit 1607 may further perform processing on computation such as pooling (pooling) or normalization (normalization). For example, the vector computation unit 1607 may apply a nonlinear function to an output of the operation circuit 1603, for example, a vector of an accumulated value, to generate an activation value. In some implementations, the vector computation unit 1607 may generate a normalized value, a combined value, or both a normalized value and a combined value.

In some implementations, the vector computation unit 1607 may store a processed vector to the unified memory 1606. In some implementations, the vector processed by the vector computation unit 1607 may be used as activation input to the operation circuit 1603, for example, to be used in a following layer of the neural network. As shown in FIG. 14, if a current processing layer is a hidden layer 1 (1431), a vector processed by the vector computation unit 1607 may be used for computation of a hidden layer 2 (1432).

The instruction fetch memory (instruction fetch buffer) 1609 connected to the controller 1604 may be configured to store an instruction used by the controller 1604. The unified memory 1606, the input memory 1601, the weight memory 1602, and the instruction fetch memory 1609 may all be on-chip memories. The external memory may be independent from the hardware architecture of the NPU.

Operations of all layers of the convolutional neural network shown in FIG. 14 and FIG. 15 may be performed by the operation circuit 1603 or the vector computation unit 1607.

Figure 17:
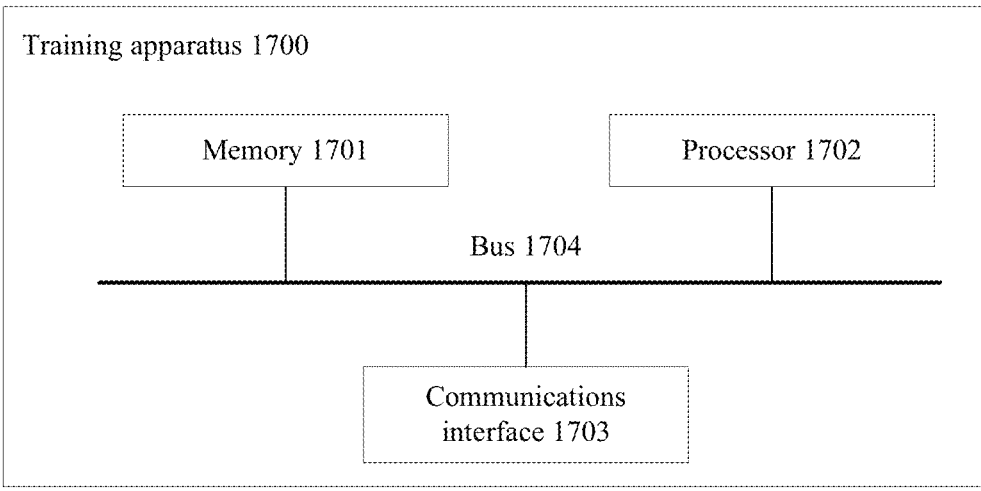
FIG. 17 illustrates a schematic diagram of a hardware structure of a training apparatus according to an embodiment of the present disclosure.

FIG. 17 illustrates a schematic diagram of a hardware structure of a training apparatus according to an embodiment of the present disclosure. A training apparatus 1700 (the apparatus 1700 may be a computer device and may refer to the training device 1320) may include a memory 1701, a processor 1702, a communications interface 1703, and a bus 1704. A communication connection is implemented between the memory 1701, the processor 1702, and the communications interface 1703 by using the bus 1704.

The memory 1701 may be a read-only memory (Read Only Memory, ROM), a static storage device, a dynamic storage device, or a random-access memory (Random Access Memory, RAM). The memory 1701 may store a program. The processor 1702 and the communications interface 1703 may be configured to perform, when the program stored in the memory 1701 is executed by the processor 1702, steps of one or more embodiments described herein.

The processor 1702 may be a general central processing unit (Central Processing Unit, CPU), a microprocessor, an application-specific integrated circuit (Application Specific Integrated Circuit, ASIC), a graphics processing unit (graphics processing unit, GPU), or one or more integrated circuits. The processor 1702 may be configured to execute a related program to implement a function that needs to be performed by a unit in the training apparatus according to one or more embodiments described herein.

In addition, the processor 1702 may be an integrated circuit chip with a signal processing capability. In an implementation process, steps of one or more training methods or embodiments described herein may be performed by an integrated logical circuit in a form of hardware or by an instruction in a form of software in the processor 1702. In addition, the foregoing processor 1702 may be a general-purpose processor, a digital signal processor (Digital Signal Processor, DSP), an application-specific integrated circuit (ASIC), a field programmable gate array (Field Programmable Gate Array, FPGA) or another programmable logic device, a discrete gate or a transistor logic device, or a discrete hardware assembly. The processor 1702 may implement or execute the methods, steps, and logical block diagrams that are disclosed in the embodiments of this disclosure. The general-purpose processor may be a microprocessor, or the processor may be any conventional processor or the like. The embodiments described herein may be directly performed by a hardware decoding processor, or may be performed by using a combination of hardware in the decoding processor and a software module. The software module may be located in a mature storage medium in the art, such as a random-access memory, a flash memory, a read-only memory, a programmable read-only memory, an electrically erasable programmable memory, or a register. The storage medium may be located in the memory 1701. The processor 1702 may read information from the memory 1701, and completes, by using hardware in the processor 1702, the functions that need to be performed by the units included in the training apparatus according to one or more embodiment described herein.

The communications interface 1703 may implement communication between the apparatus 1700 and another device or communications network by using a transceiver apparatus, for example, including but not limited to a transceiver. For example, training data (for example, one or more sets of videos) may be obtained by using the communications interface 1703.

The bus 1704 may include a path that transfers information between all the components (for example, the memory 1701, the processor 1702, and the communications interface 1703) of the apparatus 1700.

Figure 18:
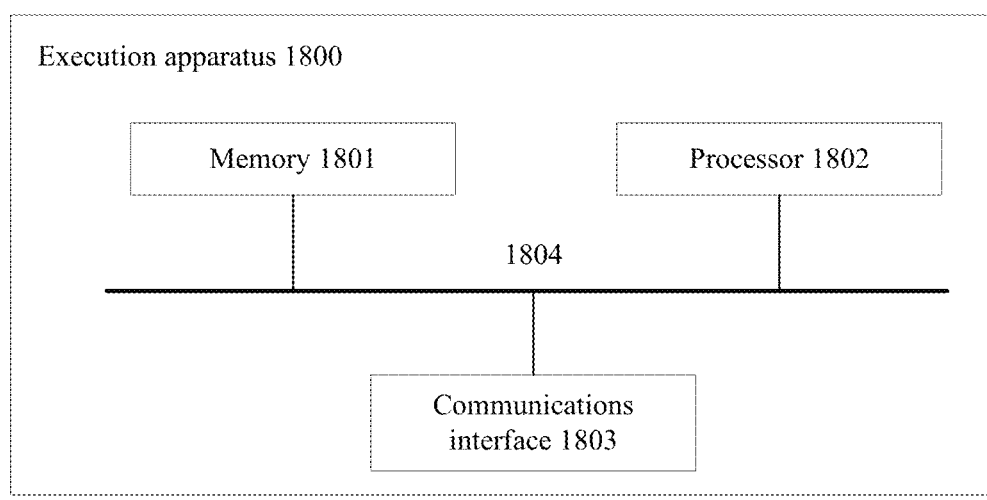
FIG. 18 illustrates a schematic diagram of a hardware structure of an execution apparatus according to an embodiment of the present disclosure.

FIG. 18 illustrates a schematic diagram of a hardware structure of an execution apparatus according to an embodiment of the present disclosure. The execution apparatus may refer to the execution device 1310 of FIG. 13. Execution apparatus 1800 (which may be a computer device) includes a memory 1801, a processor 1802, a communications interface 1803, and a bus 1804. A communication connection is implemented between the memory 1801, the processor 1802, and the communications interface 1803 by using the bus 1804.

The memory 1801 may be a read-only memory (Read Only Memory, ROM), a static storage device, a dynamic storage device, or a random-access memory (Random Access Memory, RAM). The memory 1801 may store a program. The processor 1802 and the communications interface 1803 are configured to perform, when the program stored in the memory 1801 is executed by the processor 1802, one or more one or more embodiments described herein (e.g., generating one or more of category output 126, masks 146 or 143, Re-ID embedding output 134; performing tracking and matching functionality via the tracking and matching module 152).

The processor 1802 may be a general central processing unit (Central Processing Unit, CPU), a microprocessor, an application-specific integrated circuit (Application Specific Integrated Circuit, ASIC), a graphics processing unit (graphics processing unit, GPU), or one or more integrated circuits. The processor 1802 may be configured to execute a related program to perform one or more embodiments described herein (e.g., generating one or more of category output 126, masks 146 or 143, Re-ID embedding output 134; performing tracking and matching functionality via the tracking and matching module 152).

In addition, the processor 1802 may be an integrated circuit chip with a signal processing capability. In an implementation process, one or more embodiments described herein may be performed by an integrated logical circuit in a form of hardware or by an instruction in a form of software in the processor 1802. In addition, the processor 1802 may be a general-purpose processor, a digital signal processor (Digital Signal Processor, DSP), an application-specific integrated circuit (ASIC), a field programmable gate array (Field Programmable Gate Array, FPGA) or another programmable logic device, a discrete gate or a transistor logic device, or a discrete hardware assembly. The general-purpose processor may be a microprocessor, or the processor may be any conventional processor or the like. The one or more embodiments described herein may be directly performed by a hardware decoding processor, or may be performed by using a combination of hardware in the decoding processor and a software module. The software module may be located in a mature storage medium in the art, such as a random-access memory, a flash memory, a read-only memory, a programmable read-only memory, an electrically erasable programmable memory, or a register. The storage medium may be located in the memory 1801. The processor 1802 may read information from the memory 1801, and completes, by using hardware in the processor 1802, to perform one or more embodiments described herein.

The communications interface 1803 may implement communication between the apparatus 1800 and another device or communications network by using a transceiver apparatus, for example, including but not limited to a transceiver. For example, training data in reference to one or more embodiments described herein may be obtained by using the communications interface 1803.

The bus 1804 may include a path that transfers information between all the components (for example, the memory 1801, the processor 1802, and the communications interface 1803) of the apparatus 1800.

It should be noted that, although only the memory, the processor, and the communications interface are shown in the apparatuses 1700 (in FIG. 17) and 1800 (in FIG. 14), a person skilled in the art should understand that the apparatuses 1700 and 1800 may further include other components that are necessary for implementing normal running. In addition, based on specific needs, a person skilled in the art should understand that the apparatuses 1700 and 1800 may further include hardware components that implement other additional functions. In addition, a person skilled in the art should understand that the apparatuses 1700 and 1800 may include only a component required for implementing the embodiments of the present disclosure, without a need to include all the components shown in FIG. 17 or FIG. 18.

It may be understood that the apparatus 1700 is equivalent to the training device 1320 in FIG. 13, and the apparatus 1800 is equivalent to the execution device 1310 in FIG. 13. A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

Figure 19:
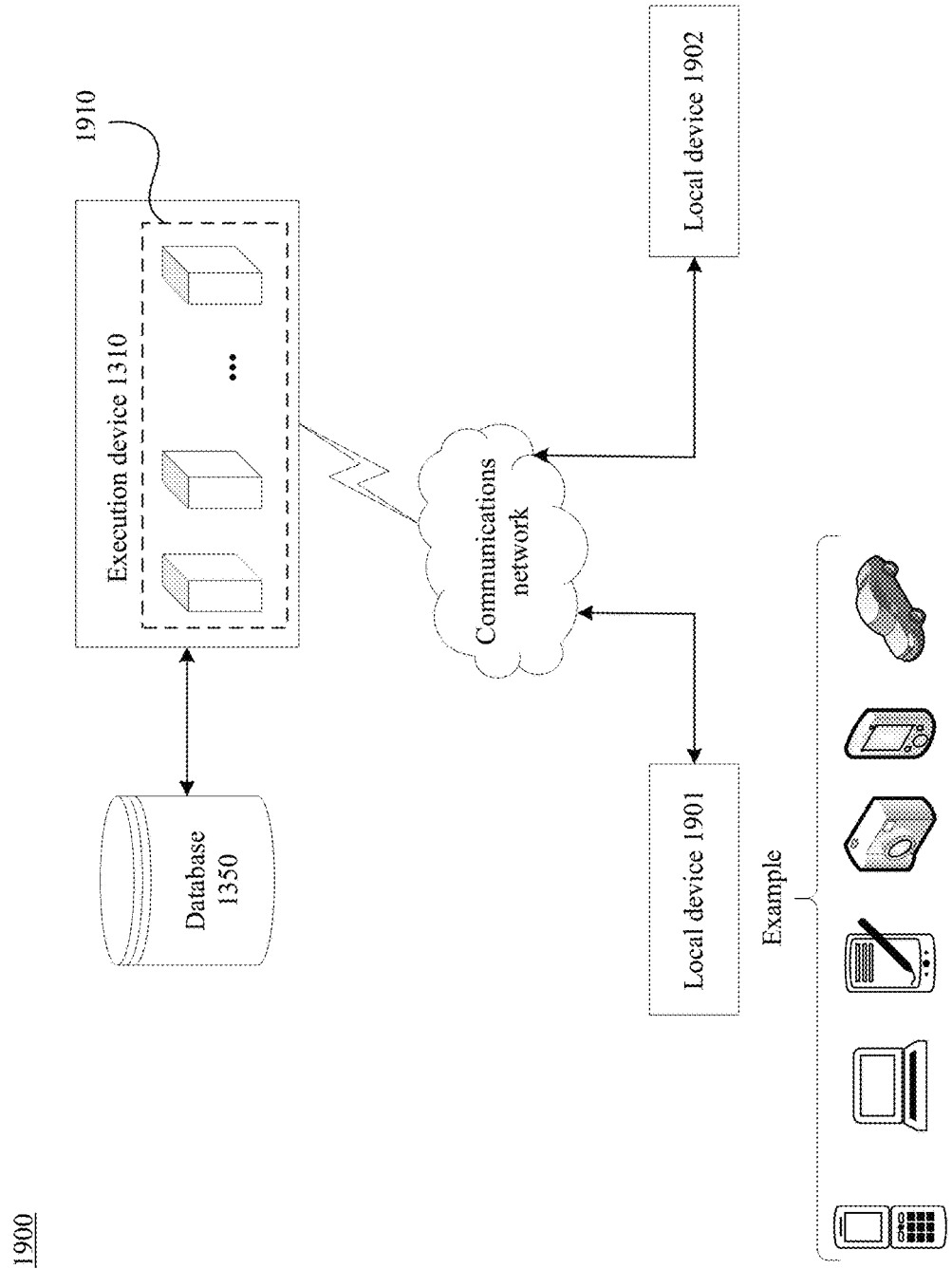
FIG. 19 illustrates a system architecture according to an embodiment of the present disclosure.

FIG. 19 illustrates a system architecture according to an embodiment of the present disclosure. The execution device 1310 may be implemented by one or more servers 1910, and optionally, supported by another computation device, for example, a data memory, a router, a load balancer, or another device. The execution device 1310 may be arranged in a physical station or be distributed to a plurality of physical stations. The execution device 1310 may use data in a data storage system 1350 or invoke program code in a data storage system 1350, to implement one or more embodiments described herein (e.g., generating one or more of category output 126, masks 146 or 143, Re-ID embedding output 134; performing tracking and matching functionality via the tracking and matching module 152).

Users may operate respective user equipment (such as a local device 1901 and a local device 1902) of the users to interact with the execution device 1310. Each local device may indicate any computation device, for example, a personal computer, a computer work station, a smartphone, a tablet computer, a smart camera, a smart car, or another type of cellular phone, a media consumption device, a wearable device, a set-top box, or a game console.

The local device of each user may interact with the execution device 1310 by using a communications network of any communications mechanism/communications standard. The communications network may be a wide area network, a local area network, a point-to-point connected network, or any combination thereof.

In another implementation, one or more aspects of the execution devices 1310 may be implemented by each local device. For example, the local device 1901 may provide local data for the execution device 1310 or feedback a computation result.

It should be noted that all functionalities of the execution device 1310 may be implemented by the local device. For example, the local device 1901 may implement a function of the execution device 1310 and provides a service for a user of the local device 1901, or provides a service for a user of the local device 1902.

It may be understood by a person skilled in the art that, for the purpose of convenient and brief description, for a detailed working process of the foregoing system, apparatus, and unit, refer to one or more corresponding embodiments described herein, and details are not described herein again.

In the several embodiments provided in this application, it should be understood that the disclosed system, apparatus, and method may be implemented in other manners. For example, the described apparatus embodiment is merely an example. For example, a plurality of units or components may be combined or integrated into another system, or some features may be ignored or not performed. In addition, the displayed or discussed communication connections may be implemented by using some interfaces. The indirect communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure, or the part contributing to the prior art, or some of the technical solutions may be implemented in a form of a software product. The software product may be stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (Read-Only Memory, ROM), a random-access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method comprising:
    sending an input image to a backbone network;
    generating, via the backbone network, one or more image feature outputs;
    sending the one or more image feature outputs to a spatial attention module for generating a feature map associated with one or more objects in the input image;
    sending the feature map to a category feature module for generating an instance category output indicating the one or more objects;
    sending the one or more image feature outputs directly from the backbone network to a mask generating module for generating one or more masks, each associated with an object in the input image; and
    generating:
        the instance category output via the category feature module; and
        the one or more masks via the mask generating module.

2. The method of claim 1, wherein the generating the one or more masks via the mask generating module comprises:
    sending the one or more image feature outputs to an instance mask feature module for generating a second set of one or more masks, each associated with an object in the input image;
    sending the second set of one or more masks to a mask refinement module for generating the one or more masks; and
    generating the one or more masks via the mask refinement module.

3. The method of claim 2, wherein:
    the one or more masks is generated based on one or more low-level image features included in the one or more image feature outputs; and
    the generating the one or more masks via the mask refinement module comprises:
        sending the one or more low-level features to the mask refinement module; and concatenating the second set of one or more masks with the one or more low-level features.

4. The method of claim 3, wherein the second set of one or more masks are trained based on Tversky loss to generate dilated masks.

5. The method of claim 4, wherein the one or more masks are trained based on one or more of edge loss and dice loss.

6. The method of claim 3, wherein each of the one or more mask is an instance mask and:
corresponds to an object in the input image; and
comprises a plurality of pixels, each indicating a probability of belonging to the object in the input image.

7. The method of claim 1, wherein the instance category output indicates the one or more object via assigning a higher score to portions of the input image comprising the one or more object than non-object portions.

8. The method of claim 1 further comprising:
sending the one or more image feature outputs to a re-identification (Re-ID) feature module for generating Re-ID embedding information associated with the one or more objects in the input image; and
generating the Re-ID embedding information via the Re-ID feature module.

9. The method of claim 8 further comprising:
sending, to a tracking and matching module, tracking information comprising one or more of: the Re-ID embedding information, the instance category output, and the one or more masks; and
tracking, by the tracking and matching module, the one or more objects based on the tracking information.

10. The method of claim 1, wherein the backbone network is a deep layer aggregation network.

11. A method comprising:
sending an input image to a backbone network;
generating, via the backbone network, one or more image feature outputs;
sending the one or more image feature outputs to a category indicating module for generating an instance category output indicating one or more objects in the input image;
sending the one or more image feature outputs directly from the backbone network to an instance mask feature module for generating a first set of one or more masks, each associated with an object in the input image;
sending the first set of one or more masks to a mask refinement module for generating a second set of one or more masks; and
generating:
the instance category output via the category indicating module; and
the second set of one or more masks via the mask refinement module.

12. The method of claim 11, wherein the generating the instance category output via the category indicating module comprises:
sending the one or more image feature outputs to a spatial attention module for generating a feature map indicating the one or more objects in the input image; and
sending the feature map to a category feature module for generating the instance category output;
generating the instance category output via the category feature module.

13. The method of claim 11, wherein:
the second set of one or more masks is generated based on one or more low-level image features included in the one or more image feature outputs; and
the generating the second set of one or more masks via the mask refinement module comprises:
sending the one or more low-level features to the mask refinement module; and
concatenating the first set of one or more masks with the one or more low-level features.

14. Method of claim 11 further comprising:
sending the one or more image feature outputs to a re-identification (Re-ID) feature module for generating Re-ID embedding information associated with the one or more objects in the input image; and
generating the Re-ID embedding information via the Re-ID feature module.

15. The method of claim 14 further comprising:
sending, to a tracking and matching module, tracking information comprising one or more of: the Re-ID embedding information, the instance category output, and the second set of one or more masks; and
tracking, by the tracking and matching module, the one or more objects based the tracking information.

16. A method comprising:
sending an input image to a backbone network;
generating, via the backbone network, one or more image feature outputs;
sending the one or more image feature outputs to a category indicating module for generating an instance category output indicating one or more objects in the input image;
sending the one or more image feature outputs directly from the backbone network to a mask generating module for generating one or more masks, each associated with an object in the input image;
sending the one or more image feature outputs to a re-identification (Re-ID) feature module for generating Re-ID embedding information associated with the one or more objects in the input image; and
generating:
the instance category output via the category indicating module;
the one or more masks via the mask generating module; and
the Re-ID embedding information via the Re-ID feature module.

17. The method of claim 16, wherein the generating the instance category output via the category indicating module comprises:
sending the one or more image feature outputs to a spatial attention module for generating a feature map indicating the one or more objects in the input image;
sending the feature map to a category feature module for generating the instance category output; and
generating the instance category output via the category feature module.

18. The method of claim 16, wherein the generating the one or more masks via the mask generating module comprises:
sending the one or more image feature outputs to an instance mask feature module for generating a second set of one or more masks, each associated with an object in the input image;
sending the second set of one or more masks to a mask refinement module for generating the one or more masks; and
generating the one or more masks via the mask refinement module.

19. The method of claim 18, wherein:
the one or more masks is generated based on one or more low-level image features included in the one or more image feature outputs; and
the generating the one or more masks via the mask refinement module comprises:
sending the one or more low-level image features to the mask refinement module;
concatenating the second set of one or more masks with the one or more low-level features.

20. The method of claim 16 further comprising:
sending, to a tracking and matching module, tracking information comprising one or more of: the Re-ID embedding information, the instance category output, and the one or more masks; and
tracking, by the tracking and matching module, the one or more objects based on the tracking information.

\* \* \* \* \*